US012718023B2

(12) United States Patent
Mathur et al.

(10) Patent No.: US 12,718,023 B2
(45) Date of Patent: Aug. 25, 2026

(54) GENERATING TEMPORAL DEPENDENCY GRAPHS

(71) Applicants: Adobe Inc., San Jose, CA (US); University of Maryland, College Park, MD (US)

(72) Inventors: Puneet Mathur, College Park, MD (US); Vlad Morariu, Potomac, MD (US); Verena Kaynig-Fittkau, Cambridge, MA (US); Jiuxiang Gu, College Park, MD (US); Franck Dernoncourt, Seattle, WA (US); Quan Tran, San Jose, CA (US); Ani Nenkova, Philadelphia, PA (US); Dinesh Manocha, College Park, MD (US); Rajiv Jain, Falls Church, VA (US)

(73) Assignees: Adobe Inc., San Jose, CA (US); University of Maryland, College Park, MD (US)

( * ) Notice: Subject to any disclaimer, the term of this patent is extended or adjusted under 35 U.S.C. 154(b) by 302 days.

(21) Appl. No.: 18/493,465

(22) Filed: Oct. 24, 2023

(65) Prior Publication Data

US 2025/0013831 A1 Jan. 9, 2025

Related U.S. Application Data

(60) Provisional application No. 63/512,408, filed on Jul. 7, 2023.

(51) Int. Cl.
*G06F 17/00* (2019.01)
*G06F 40/30* (2020.01)

(52) U.S. Cl.
CPC .................................... *G06F 40/30* (2020.01)

(58) Field of Classification Search
None
See application file for complete search history.

(56) References Cited

U.S. PATENT DOCUMENTS 10,380,259 B2 * 8/2019 Lee ........................ G06N 3/044
11,182,562 B2 * 11/2021 Lee .......................... G06N 5/04
(Continued)

OTHER PUBLICATIONS

A. Leeuwenberg and Marie-Francine Moens. 2018. Temporal information extraction by predicting relative time-lines. ArXiv, abs/1808.09401.
(Continued)

*Primary Examiner* — Satwant K Singh
(74) *Attorney, Agent, or Firm* — Keller Preece PLLC

(57) ABSTRACT

The present disclosure relates to systems, methods, and non-transitory computer-readable media that generates a temporal dependency graph. For example, the disclosed systems generate from a text document, a structural vector, a syntactic vector, and a semantic vector. In some embodiments, the disclosed systems generate a multi-dimensional vector by combining the various vectors. In these or other embodiments, the disclosed systems generate an initial dependency graph structure and an adjacency matrix utilizing an iterative deep graph learning model. Further, in some embodiments, the disclosed systems generate an entity-level relation matrix utilizing a convolutional graph neural network. Moreover, in some embodiments, the disclosed systems generate a temporal dependency graph from the entity-level relation matrix and the adjacency matrix.

20 Claims, 14 Drawing Sheets

(56) References Cited

U.S. PATENT DOCUMENTS

| | | | | |
|---|---|---|---|---|
| 11,442,963 | B1 * | 9/2022 | Lecue | G06F 16/906 |
| 12,333,246 | B1 * | 6/2025 | Gupta | G06N 5/01 |
| 2020/0073879 | A1 * | 3/2020 | Grabau | G06N 3/042 |
| 2021/0089971 | A1 * | 3/2021 | Grabau | G06N 3/09 |
| 2022/0093088 | A1 * | 3/2022 | Rangarajan Sridhar | G06F 16/338 |
| 2022/0335216 | A1 * | 10/2022 | Ren | G06N 3/0895 |
| 2024/0304175 | A1 * | 9/2024 | Erdmann | G10L 13/047 |

OTHER PUBLICATIONS

A. Leeuwenberg and Marie-Francine Moens. 2019. A survey on temporal reasoning for temporal information extraction from text. ArXiv, abs/2005.06527.

Akash Gautam, Puneet Mathur, Rakesh Gosangi, Debanjan Mahata, Ramit Sawhney, and Rajiv Ratn Shah. 2020. # metooma: Multi-aspect annotations of tweets related to the metoo movement. In Proceedings of the International AAAI Conference on Web and Social Media, vol. 14, pp. 209-216.

Alexis Conneau, Douwe Kiela, Holger Schwenk, Loic Barrault, and Antoine Bordes. 2017. Supervised learning of universal sentence representations from natural language inference data. arXiv preprint arXiv:1705.02364.

Dan Hendrycks, Collin Burns, Anya Chen, and Spencer Ball. 2021. Cuad: An expert-annotated nlp dataset for legal contract review. arXiv preprint arXiv:2103.06268.

Eliyahu Kiperwasser and Miguel Ballesteros. 2018. Scheduled multi-task learning: From syntax to translation. Transactions of the Association for Computational Linguistics, 6:225-240.

Ganesh Jawahar, Benoît Sagot, and Djamé Seddah. 2019. What does bert learn about the structure of language? In ACL 2019—57th Annual Meeting of the Association for Computational Linguistics.

Gautier Izacard and Edouard Grave. 2020. Leveraging passage retrieval with generative models for open domain question answering. arXiv preprint arXiv:2007.01282.

Gautier Izacard and Edouard Grave. 2021. Leveraging passage retrieval with generative models for open domain question answering. In EACL.

Hayley Ross, Jonathon Cai, and Bonan Min. 2020a. Exploring Contextualized Neural Language Models for Temporal Dependency Parsing. In Proceedings of the 2020 Conference on Empirical Methods in Natural Language Processing (EMNLP), pp. 8548-8553, Online. Association for Computational Linguistics.

Hayley Ross, Jonathon Cai, and Bonan Min. 2020b. Exploring contextualized neural language models for temporal dependency parsing. arXiv preprint arXiv:2004.14577.

Hongyang Gao and Shuiwang Ji. 2019. Graph u-nets. In international conference on machine learning, pp. 2083-2092. PMLR.

Jacob Devlin, Ming-Wei Chang, Kenton Lee, and Kristina Toutanova. 2019. Bert: Pre-training of deep bidirectional transformers for language understanding. ArXiv, abs/1810.04805.

James F Allen. 1983. Maintaining knowledge about temporal intervals. Communications of the ACM, 26(11):832-843.

James Pustejovsky and Amber Stubbs. 2011. Increasing informativeness in temporal annotation. In Proceedings of the 5th Linguistic Annotation Workshop, pp. 152-160.

James Pustejovsky, Patrick Hanks, Roser Saurí, Andrew See, Rob Gaizauskas, Andrea Setzer, Dragomir Radev, Beth Sundheim, David Day, Lisa Ferro, and Marcia Lazo. 2003b. The timebank corpus. Proceedings of Corpus Linguistics.

James Pustejovsky, Patrick Hanks, Roser Sauri, Andrew See, Robert Gaizauskas, Andrea Setzer, Dragomir Radev, Beth Sundheim, David Day, Lisa Ferro, et al. 2003a. The timebank corpus. In Corpus linguistics, vol. 2003, p. 40. Lancaster, UK.

Jannik Strötgen and Michael Gertz. 2013. Multilingual and cross-domain temporal tagging. Language Resources and Evaluation, 47(2):269-298.

Jiangang Bai, Yujing Wang, Yiren Chen, Yaming Yang, Jing Bai, Jing Yu, and Yunhai Tong. 2021a. Syntaxbert: Improving pre-trained transformers with syntax trees. arXiv preprint arXiv:2103.04350.

Jiarui Yao, Haoling Qiu, Bonan Min, and Nianwen Xue. 2020a. Annotating temporal dependency graphs via crowdsourcing. In EMNLP.

Jiarui Yao, Haoling Qiu, Bonan Min, and Nianwen Xue. 2020b. Annotating Temporal Dependency Graphs via Crowdsourcing. In Proceedings of the 2020 Conference on Empirical Methods in Natural Language Processing (EMNLP), pp. 5368-5380, Online. Association for Computational Linguistics.

John Hewitt and Christopher D Manning. 2019. A structural probe for finding syntax in word representations. In Proceedings of the 2019 Conference of the North American Chapter of the Association for Computational Linguistics: Human Language Technologies, vol. 1 (Long and Short Papers), pp. 4129-4138.

Ke Shi, Zhengyuan Liu, and Nancy F Chen. 2020. An end-to-end document-level neural discourse parser exploiting multi-granularity representations. arXiv preprint arXiv:2012.11169.

Liang Yao, Chengsheng Mao, and Yuan Luo. 2019. Graph convolutional networks for text classification. In Proceedings of the AAAI conference on artificial intelligence, vol. 33, pp. 7370-7377.

Lianhui Qin, Aditya Gupta, Shyam Upadhyay, Luheng He, Yejin Choi, and Manaal Faruqui. 2021. Timedial: Temporal commonsense reasoning in dialog. arXiv preprint arXiv:2106.04571.

Mandar Joshi, Danqi Chen, Yinhan Liu, Daniel S Weld, Luke Zettlemoyer, and Omer Levy. 2020. Spanbert: Improving pre-training by representing and predicting spans. Transactions of the Association for Computational Linguistics, 8:64-77.

Manzil Zaheer, Guru Guruganesh, Kumar Avinava Dubey, Joshua Ainslie, Chris Alberti, Santiago Ontañón, Philip Pham, Anirudh Ravula, Qifan Wang, Li Yang, and Amr Ahmed. 2020a. Big bird: Transformers for longer sequences. ArXiv, abs/2007.14062.

Manzil Zaheer, Guru Guruganesh, Kumar Avinava Dubey, Joshua Ainslie, Chris Alberti, Santiago Ontanon, Philip Pham, Anirudh Ravula, Qifan Wang, Li Yang, et al. 2020b. Big bird: Transformers for longer sequences. In NeurIPS.

Miguel Ballesteros, Rishita Anubhai, Shuai Wang, Nima Pourdamghani, Yogarshi Vyas, Jie Ma, Parminder Bhatia, K. McKeown, and Yaser Al-Onaizan. 2020. Severing the edge between before and after: Neural architectures for temporal ordering of events. ArXiv, abs/2004.04295.

Mohammed Aldawsari, Adrian Perez, Deya Banisakher, and Mark Finlayson. 2020. Distinguishing between foreground and background events in news. In Proceedings of the 28th International Conference on Computational Linguistics, pp. 5171-5180.

Mohit Iyyer, Varun Manjunatha, Jordan Boyd-Graber, and Hal Daumé III. 2015. Deep unordered composition rivals syntactic methods for text classification. In Proceedings of the 53rd annual meeting of the association for computational linguistics and the 7th international joint conference on natural language processing (vol. 1: Long papers), pp. 1681-1691.

Nathanael Chambers, Taylor Cassidy, Bill McDowell, and Steven Bethard. 2014. Dense event ordering with a multi-pass architecture. Transactions of the Association for Computational Linguistics, 2:273-284.

Nils Reimers and Iryna Gurevych. 2019. Sentence—BERT: Sentence embeddings using Siamese BERTnetworks. In Proceedings of the 2019 Conference on Empirical Methods in Natural Language Processing and the 9th International Joint Conference on Natural Language Processing (EMNLP-IJCNLP), pp. 3982-3992, Hong Kong, China. Association for Computational Linguistics.

Octavian-Eugen Ganea, Gary Bécigneul, and Thomas Hofmann. 2018. Hyperbolic neural networks. arXiv preprint arXiv:1805.09112.

Oleksandr Kolomiyets, Steven Bethard, and Marie Francine Moens. 2012. Extracting narrative timelines as temporal dependency structures. In Proceedings of the 50th Annual Meeting of the Association for Computational Linguistics (vol. 1: Long Papers), pp. 88-97.

Parminder Bhatia, Yangfeng Ji, and Jacob Eisenstein. 2015. Better document-level sentiment analysis from rst discourse parsing. arXiv preprint arXiv:1509.01599.

(56) References Cited

OTHER PUBLICATIONS

Pontus Stenetorp, Sampo Pyysalo, Goran Topi'c, Tomoko Ohta, Sophia Ananiadou, and Jun'ichi Tsujii. 2012. Brat: a web-based tool for nlp-assisted text annotation. In Proceedings of the Demonstrations at the 13th Conference of the European Chapter of the Association for Computational Linguistics, pp. 102-107.
Puneet Mathur, Meghna Ayyar, Sahil Chopra, Simra Shahid, Laiba Mehnaz, and Rajiv Shah. 2018a. Identification of emergency blood donation request on twitter. In Proceedings of the 2018 EMNLP Workshop SMM4H: The 3rd Social Media Mining for Health Applications Workshop & Shared Task, pp. 27-31.
Puneet Mathur, Rajiv Jain, Franck Dernoncourt, Vlad Morariu, Quan Hung Tran, and Dinesh Manocha. 2021a. Timers: Document-level temporal relation extraction. In Proceedings of the 59th Annual Meeting of the Association for Computational Linguistics and the 11th International Joint Conference on Natural Language Processing (vol. 2: Short Papers), pp. 524-533, Online. Association for Computational Linguistics.
Puneet Mathur, Rajiv Jain, Franck Dernoncourt, Vlad Morariu, Quan Hung Tran, and Dinesh Manocha. 2021b. Timers: Document-level temporal relation extraction. In Proceedings of the 59th Annual Meeting of the Association for Computational Linguistics and the 11th International Joint Conference on Natural Language Processing (vol. 2: Short Papers), pp. 524-533.
Puneet Mathur, Rajiv Shah, Ramit Sawhney, and Debanjan Mahata. 2018b. Detecting offensive tweets in hindi-english code-switched language. In Proceedings of the Sixth International Workshop on Natural Language Processing for Social Media, pp. 18-26.
Puneet Mathur, Ramit Sawhney, Shivang Chopra, Maitree Leekha, and Rajiv Ratn Shah. 2020. Utilizing temporal psycholinguistic cues for suicidal intent estimation. In European Conference on Information Retrieval, pp. 265-271. Springer.
Qiang Ning, Hao Wu, and Dan Roth. 2018. A multiaxis annotation scheme for event temporal relations. In ACL.
Qiang Ning, Hao Wu, Rujun Han, Nanyun Peng, Matt Gardner, and Dan Roth. 2020a. Torque: A reading comprehension dataset of temporal ordering questions. In EMNLP.
Qiang Ning, Hao Wu, Rujun Han, Nanyun Peng, Matt Gardner, and Dan Roth. 2020b. Torque: A reading comprehension dataset of temporal ordering questions. arXiv preprint arXiv:2005.00242.
Qiang Ning, Sanjay Subramanian, and D. Roth. 2019a. An improved neural baseline for temporal relation extraction. In EMNLP/IJCNLP.
Qiang Ning, Sanjay Subramanian, and Dan Roth. 2019b. An improved neural baseline for temporal relation extraction. arXiv preprint arXiv:1909.00429.
Ramit Sawhney, Puneet Mathur, Ayush Mangal, Piyush Khanna, Rajiv Ratn Shah, and Roger Zimmermann. 2020. Multimodal multi-task financial risk forecasting. In Proceedings of the 28th ACM international conference on multimedia, pp. 456-465.
Ramit Sawhney, Puneet Mathur, Taru Jain, Akash Kumar Gautam, and Rajiv Shah. 2021. Multitask learning for emotionally analyzing sexual abuse disclosures. In Proceedings of the 2021 Conference of the North American Chapter of the Association for Computational Linguistics: Human Language Technologies, pp. 4881-4892.
Rohan Mishra, Pradyumn Prakhar Sinha, Ramit Sawhney, Debanjan Mahata, Puneet Mathur, and Rajiv Ratn Shah. 2019. Snap-batnet: Cascading author profiling and social network graphs for suicide ideation detection on social media. In Proceedings of the 2019 conference of the North American Chapter of the association for computational linguistics: student research workshop, pp. 147-156.
Rujun Han, I-Hung Hsu, Mu Yang, A. Galstyan, R.Weischedel, and Nanyun Peng. 2019a. Deep structured neural network for event temporal relation extraction. In CoNLL.
Rujun Han, Mengyue Liang, Bashar Alhafni, and Nanyun Peng. 2019b. Contextualized word embeddings enhanced event temporal relation extraction for story understanding. ArXiv, abs/1904.11942.
Rujun Han, Qiang Ning, and Nanyun Peng. 2019c. Joint event and temporal relation extraction with shared representations and structured prediction. In EMNLP/IJCNLP.
Rujun Han, Yichao Zhou, and Nanyun Peng. 2020. Domain knowledge empowered structured neural net for end-to-end event temporal relation extraction. ArXiv, abs/2009.07373.
Shivang Chopra, Ramit Sawhney, Puneet Mathur, and Rajiv Ratn Shah. 2020. Hindi-english hate speech detection: Author profiling, debiasing, and practical perspectives. In Proceedings of the AAAI Conference on Artificial Intelligence, vol. 34, pp. 386-393.
Siddharth Vashishtha, Adam Poliak, Yash Kumar Lal, Benjamin Van Durme, and Aaron Steven White. 2020. Temporal reasoning in natural language inference. In Findings of the Association for Computational Linguistics: EMNLP 2020, pp. 4070-4078, Online. Association for Computational Linguistics.
Song Bai, Feihu Zhang, and Philip HS Torr. 2021b. Hypergraph convolution and hypergraph attention. Pattern Recognition, 110:107637.
Steven Bethard, Guergana Savova, Wei-Te Chen, Leon Derczynski, James Pustejovsky, and Marc Verhagen. 2016. Semeval-2016 task 12: Clinical tempeval. In Proceedings of the 10th International Workshop on Semantic Evaluation (SemEval-2016), pp. 1052-1062.
Tanya Goyal and Greg Durrett. 2019. Embedding time expressions for deep temporal ordering models. In ACL.
Taylor Cassidy, Bill McDowell, Nathanel Chambers, and Steven Bethard. 2014. An annotation framework for dense event ordering. Technical report, Carnegie-Mellon Univ Pittsburgh PA.
Thomas N Kipf and Max Welling. 2016. Semisupervised classification with graph convolutional networks. arXiv preprint arXiv:1609.02907.
Trisha Mittal, Puneet Mathur, Aniket Bera, and Dinesh Manocha. 2021. Affect2mm: Affective analysis of multimedia content using emotion causality. In Proceedings of the IEEE/CVF Conference on Computer Vision and Pattern Recognition, pp. 5661-5671.
Wenhu Chen, Xinyi Wang, and William Yang Wang. 2021. A dataset for answering time-sensitive questions. ArXiv, abs/2108.06314.
Woojeong Jin, Rahul Khanna, Suji Kim, Dong-Ho Lee, Fred Morstatter, Aram Galstyan, and Xiang Ren. 2020. Forecastqa: A question answering challenge for event forecasting with temporal text data. arXiv preprint arXiv:2005.00792.
Xinyu Zhao, Shih-ting Lin, and Greg Durrett. 2020. Effective distant supervision for temporal relation extraction. arXiv preprint arXiv:2010.12755.
Yifan Feng, Haoxuan You, Zizhao Zhang, Rongrong Ji, and Yue Gao. 2019. Hypergraph neural networks. In Proceedings of the AAAI Conference on Artificial Intelligence, vol. 33, pp. 3558-3565.
Yinhan Liu, Myle Ott, Naman Goyal, Jingfei Du, Mandar Joshi, Danqi Chen, Omer Levy, Mike Lewis, Luke Zettlemoyer, and Veselin Stoyanov. 2019a. Roberta: A robustly optimized bert pretraining approach. ArXiv, abs/1907.11692.
Yinhan Liu, Myle Ott, Naman Goyal, Jingfei Du, Mandar Joshi, Danqi Chen, Omer Levy, Mike Lewis, Luke Zettlemoyer, and Veselin Stoyanov. 2019b. Roberta: A robustly optimized bert pretraining approach. arXiv preprint arXiv:1907.11692.
Yu Chen, Lingfei Wu, and Mohammed Zaki. 2020. Iterative deep graph learning for graph neural networks: Better and robust node embeddings. Advances in Neural Information Processing Systems, 33.
Yuchen Zhang and Nianwen Xue. 2018a. Neural ranking models for temporal dependency structure parsing. arXiv preprint arXiv:1809.00370.
Yuchen Zhang and Nianwen Xue. 2018b. Structured interpretation of temporal relations. arXiv preprint arXiv:1808.07599.
Yuchen Zhang and Nianwen Xue. 2019. Acquiring structured temporal representation via crowdsourcing: A feasibility study. in *Semeval.
Yunseok Noh, Yong-Min Shin, Junmo Park, A.-Yeong Kim, Su Jeong Choi, Hyun-Je Song, Seongbae Park, and Seyoung Park. 2020. Wire: An automated report generation system using topical and temporal summarization. Proceedings of the 43rd International ACM SIGIR Conference on Research and Development in Information Retrieval.
Yuxiao Lin, Yuxian Meng, Xiaofei Sun, Qinghong Han, Kun Kuang, Jiwei Li, and Fei Wu. 2021. Bertgcn: Transductive text classification by combining gcn and bert. arXiv preprint arXiv:2105.05727.

(56) References Cited

OTHER PUBLICATIONS

Zhengyuan Liu, Ke Shi, and Nancy F Chen. 2021. Coreference-aware dialogue summarization. arXiv preprint arXiv:2106.08556.

Zhenyu Zhang, Bowen Yu, Xiaobo Shu, Tingwen Liu, Hengzhu Tang, Wang Yubin, and Li Guo. 2020. Document-level relation extraction with dual-tier heterogeneous graph. In Proceedings of the 28th International Conference on Computational Linguistics, pp. 1630-1641.

* cited by examiner

Figure 3:
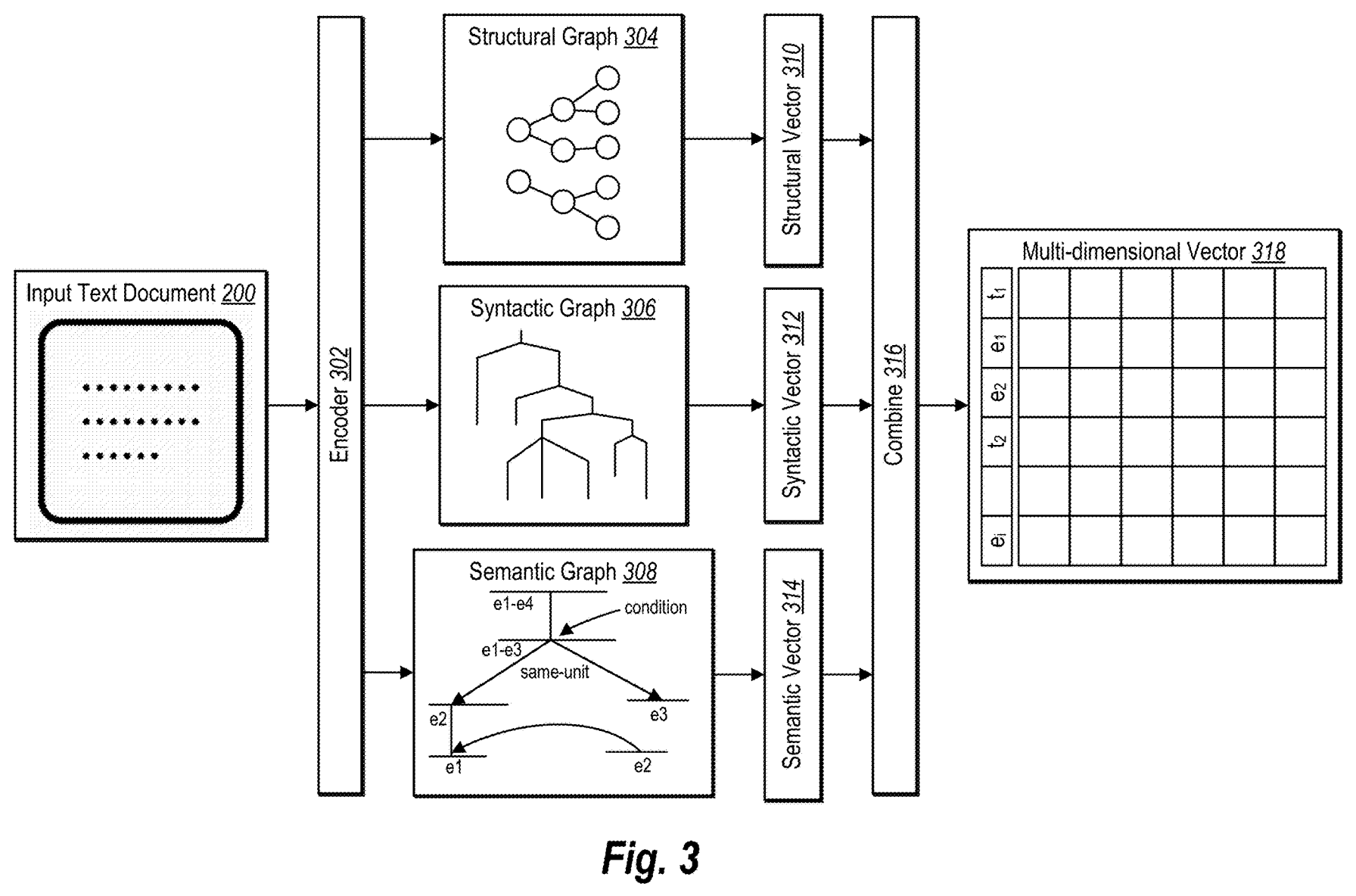

Input Text Document 200

Encoder 302

Structural Graph 304

Syntactic Graph 306

Semantic Graph 308 condition same-unit e1-e4 e1-e3 e2 e1 e3 e2

Structural Vector 310

Syntactic Vector 312

Semantic Vector 314

Combine 316

Multi-dimensional Vector 318

| | System | TD-Trees | | | | TD-Graphs | | | | ContractTDG | | | |
|---|---|---|---|---|---|---|---|---|---|---|---|---|---|
| | | Structure-only | | Structure+Relation | | Structure-only | | Structure+Relation | | Structure-only | | Structure+Relation | |
| | | Dev | Test | Dev | Test | Dev | Test | Dev | Test | Dev | Test | Dev | Test |
| Baselines | Majority Baseline | 0.43 | 0.42 | 0.15 | 0.18 | 0.62 | 0.68 | 0.41 | 0.51 | 0.36 | 0.35 | 0.36 | 0.33 |
| | Logistic Regression Baseline (Zhang and Xue, 2018a) | 0.64 | 0.70 | 0.26 | 0.29 | 0.62 | 0.69 | 0.49 | 0.58 | 0.42 | 0.39 | 0.45 | 0.38 |
| | Neural Ranking Parser (BiLSTM) (Zhang and Xue, 2018a) | 0.75 | 0.79 | 0.53 | 0.60 | 0.69 | 0.79 | 0.55 | 0.66 | 0.49 | 0.46 | 0.52 | 0.48 |
| | BERT Ranking Parser (Ross et al., 2020b) | 0.77 | 0.83 | 0.59 | 0.68 | 0.71 | 0.80 | 0.62 | 0.71 | 0.67 | 0.65 | 0.62 | 0.61 |
| | **DocTime** (ours) | **0.85*** | **0.86*** | **0.66*** | **0.72*** | **0.74*** | **0.85*** | **0.69*** | **0.77*** | **0.70*** | **0.69*** | **0.68*** | **0.64*** |
| Ablation | DocTime w\o Graph U-net | 0.83 | 0.84 | 0.63 | 0.70 | 0.71 | 0.82 | 0.67 | 0.75 | 0.68 | 0.63 | 0.66 | 0.62 |
| | DocTime w\o Structure Graph | 0.81 | 0.80 | 0.62 | 0.65 | 0.67 | 0.72 | 0.65 | 0.73 | 0.67 | 0.63 | 0.64 | 0.60 |
| | DocTime w\o Syntactic Graph | 0.80 | 0.82 | 0.62 | 0.66 | 0.65 | 0.73 | 0.62 | 0.69 | 0.64 | 0.61 | 0.62 | 0.59 |
| | DocTime w\o Semantic Graph | 0.76 | [illegible] | 0.55 | [illegible] | 0.62 | [illegible] | 0.60 | [illegible] | 0.59 | [illegible] | 0.59 | [illegible] |
| | DocTime w\ Graph Prediction | 0.72 | 0.64 | 0.49 | 0.55 | 0.57 | 0.65 | 0.57 | 0.58 | 0.59 | 0.53 | 0.55 | 0.54 |
| | DocTime w\ Pairwise Link Prediction | 0.82 | 0.83 | 0.63 | 0.69 | 0.72 | 0.83 | 0.66 | 0.73 | 0.65 | 0.60 | 0.62 | 0.60 |
| | DocTime w\ Path Prediction Loss | 0.85 | 0.86 | 0.66 | 0.72 | 0.74 | 0.85 | 0.69 | 0.77 | 0.70 | 0.69 | 0.68 | 0.64 |

*Fig. 8*

| Model | Easy-mode | | | | Hard-mode | | | |
|---|---|---|---|---|---|---|---|---|
| | Dev | | Test | | Dev | | Test | |
| | EM | F1 | EM | F1 | EM | F1 | EM | F1 |
| **FT on TimeQA** | | | | | | | | |
| BigBird (Zaheer et al., 2020b) | 16.4 | 27.5 | 16.3 | 27.1 | 11.4 | 20.6 | 11.9 | 20.3 |
| Time-BigBird (E) | 15.5 | 25.0 | 14.1 | 25.5 | 9.6 | 15.6 | 9.3 | 18.5 |
| Time-BigBird | **18.9** | **29.5** | **18.9** | **29.5** | **13.0** | **22.5** | **13.0** | **22.8** |
| FiD (Izacard and Grave, 2020) | 15.9 | 27.1 | 15.7 | 28.0 | 10.7 | 19.1 | 10.3 | 19.7 |
| Time-FiD (E) | 13.8 | 25.2 | 12.1 | 25.6 | 8.9 | 17.3 | 8.8 | 17.6 |
| Time-FiD | **17.5** | **29.3** | **18.1** | **30.3** | **12.5** | **22.2** | **12.5** | **21.5** |
| **FT on TriviaQA** | | | | | | | | |
| BigBird (Zaheer et al., 2020b) | 33.4 | 42.5 | 33.7 | 43.0 | 27.7 | 35.9 | 27.7 | 36.2 |
| Time-BigBird (E) | 31.3 | 40.4 | 32.3 | 41.8 | 25.9 | 33.6 | 25.8 | 35.5 |
| Time-BigBird | **35.0** | **44.8** | **35.1** | **45.5** | **29.2** | **36.6** | **29.2** | **38.0** |
| **FT on NQ + TimeQA** | | | | | | | | |
| FiD (Izacard and Grave, 2020) | 59.5 | 66.9 | 60.5 | 67.9 | 45.3 | 54.3 | 46.8 | 54.6 |
| Temp-FiD (E) | 57.9 | 65.6 | 58.5 | 65.2 | 41.1 | 52.6 | 44.5 | 52.8 |
| Time-FiD | **61.3** | **68.2** | **62.4** | **69.6** | **46.7** | **56.2** | **48.2** | **56.4** |

*Fig. 9*

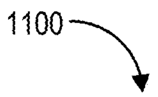
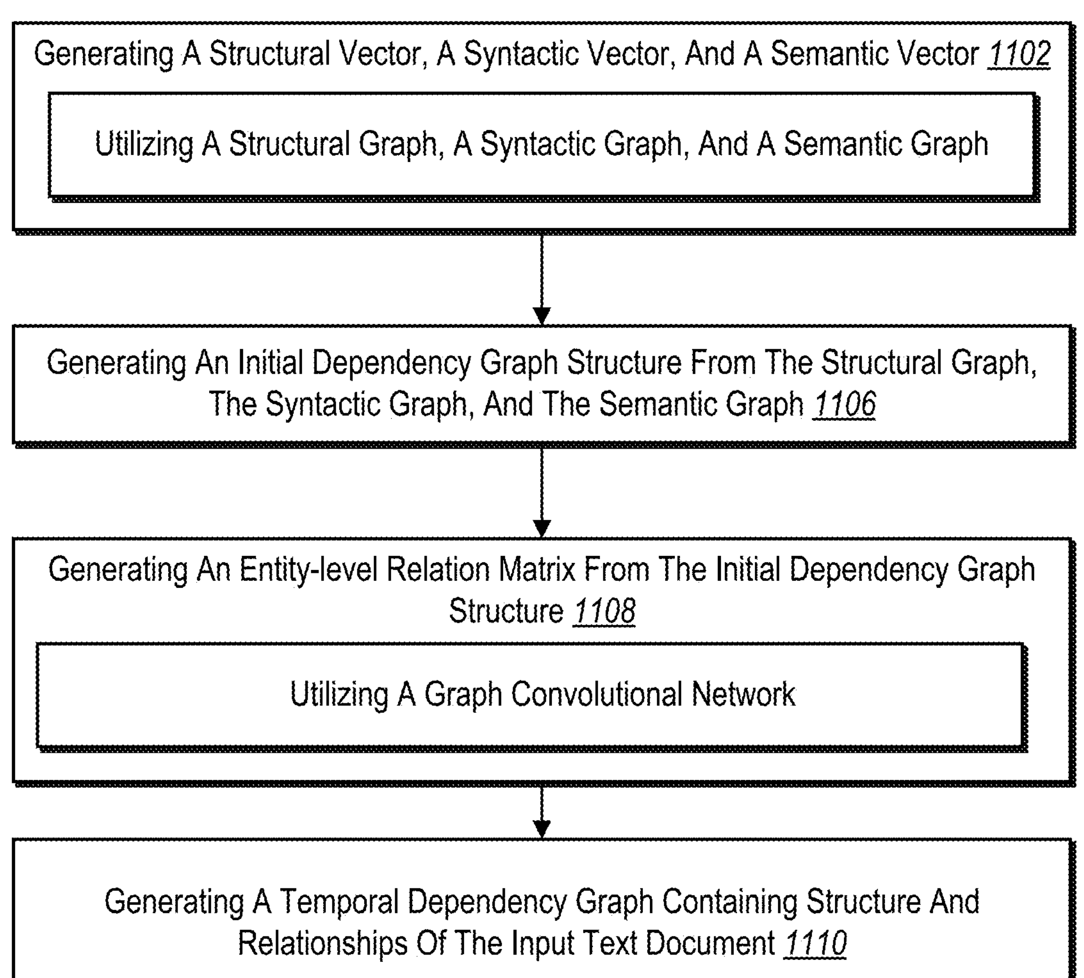
Fig. 11

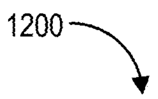
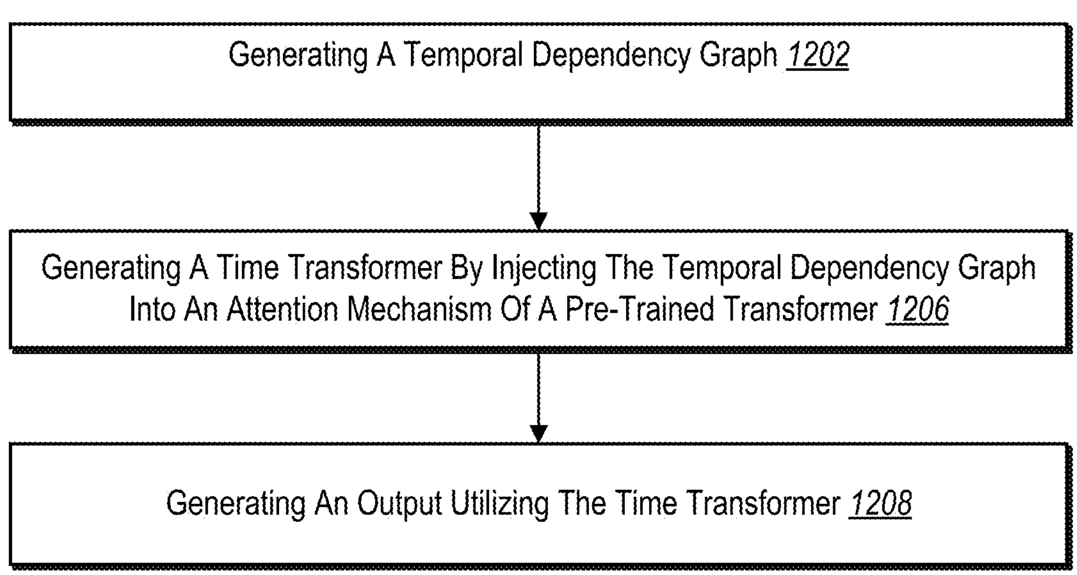
*Fig. 12*

GENERATING TEMPORAL DEPENDENCY GRAPHS

CROSS-REFERENCE TO RELATED APPLICATIONS

This application claims priority to, and the benefit of, U.S. Provisional Patent Application No. 63/512,408 filed Jul. 7, 2023, which is incorporated herein by reference in its entirety.

BACKGROUND

Recent years have seen significant advancement in software platforms for document understanding tasks. For example, document understanding tasks is an area currently being explored and provides the ability to understand free format language in documents. In particular, many document understanding tasks involve analysis of words in a document to determine different relationships between words. However, despite these advancements, existing document understanding systems continue to suffer from a variety of problems with regard to computational accuracy and operational flexibility.

SUMMARY

Embodiments of the present disclosure solve one or more problems in the art with systems, non-transitory computer-readable media, and methods for utilizing a document understanding pipeline (e.g., a temporal dependency graph parser), which takes as input a text document and produces a temporal dependency graph. For example, in one or more embodiments, the document understanding pipeline utilizes contextual features (e.g., structural, syntactic, and semantic features) to infer temporal relationships robustly and efficiently. Furthermore, in one or more embodiments, the document understanding pipeline utilizes a graph neural network and a path prediction loss to reason over long-range multi-hop dependencies while maintaining global consistency of temporal ordering of inter-dependent events. In addition, in some embodiments, the disclosed system further improves downstream document understanding tasks by incorporating the temporal dependency graph into a self-attention layer of a transformer to make the transformer temporally-aware for use in downstream tasks.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

FIG. 3 illustrates an example diagram of the temporal dependency understanding system generating a multi-dimensional vector from a structural vector, a syntactic vector, and a semantic vector in accordance with one or more embodiments.

FIG. 8 illustrates results of the temporal dependency understanding system compared with baselines and ablative components in accordance with one or more embodiments.

FIG. 9 illustrates results of the temporal dependency understanding system utilizing a time transformer with a temporal dependency graph integrated into the self-attention layer compared to prior systems in accordance with one or more embodiments.

FIG. 11 illustrates a flowchart of a series of acts for generating a temporal dependency graph in accordance with one or more embodiments.

FIG. 12 illustrates a flowchart of a series of acts for generating an output prediction in accordance with one or more embodiments.

DETAILED DESCRIPTION

Figure 1:
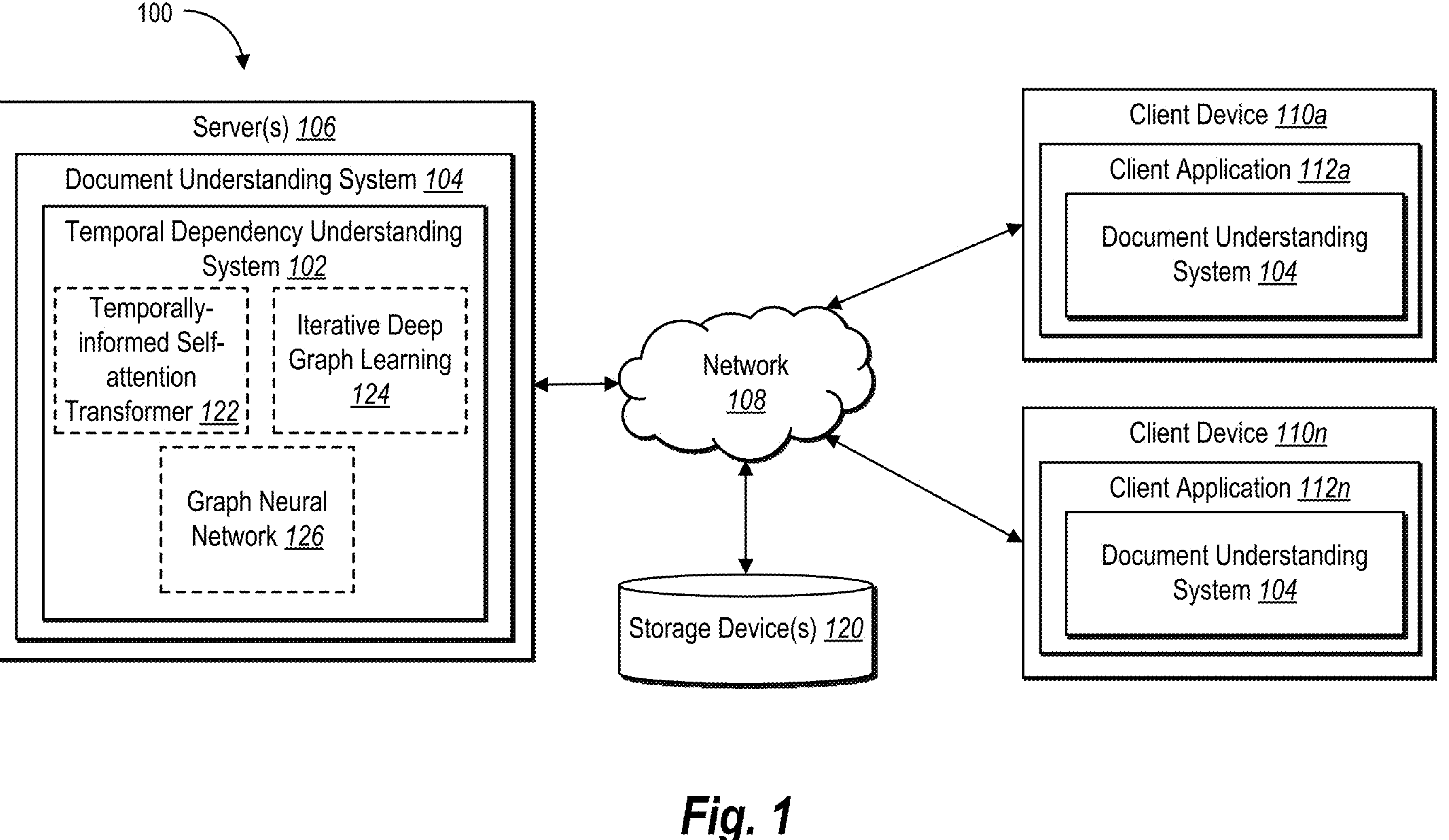
FIG. 1 illustrates a diagram of an environment in which a temporal dependency understanding system operates in accordance with one or more embodiments.

This disclosure describes one or more embodiments of a temporal dependency understanding system that utilizes a temporal dependency graph parser (e.g., a document understanding pipeline) to understand temporal cues in documents. Specifically, the temporal dependency understanding system utilizes a graph network and a novel path prediction loss to reason over long-range multi-hop dependencies (e.g., while maintaining global consistency of temporal ordering for inter-dependent events). For instance, in some embodiments the temporal dependency understanding system utilizes a novel pipeline that includes an iterative deep graph learning model and a convolutional graph neural network. Additionally, the temporal dependency understanding system, in one or more implementations, includes a time transformer that incorporates temporal dependency graphs into a transformer-based neural network architecture to leverage knowledge from the temporal dependency graphs (e.g., for use in downstream document understanding tasks).

As mentioned above, the temporal dependency understanding system utilizes a novel document understanding pipeline (e.g., a document-level temporal dependency parser). For instance, as part of the document understanding pipeline, the temporal dependency understanding system predicts a temporal dependency graph from text within a document in an end-to-end manner. Specifically, the temporal dependency understanding system generates a structural vector, a syntactic vector, and a semantic vector from text within a document. The temporal dependency understanding system utilizes this contextual information to generate the temporal dependency graph.

Specifically, in some embodiments, the temporal dependency understanding system generates an initial dependency graph structure with an adjacency matrix from a multi-dimensional vector generated from the structural vector, the syntactic vector, and the semantic vector. Further, in some embodiments the temporal dependency understanding system utilizes a convolutional graph neural network to generate an entity-level relation matrix from the initial dependency graph structure. Additionally, in some embodiments the temporal dependency understanding system generates a temporal dependency graph that contains the structure and relationships of text within the document based on the entity-level relation matrix and the adjacency matrix.

As mentioned above, in some implementations the temporal dependency understanding system incorporates the temporal dependency graph into a transformer-based neural network. For example, the temporal dependency understanding system incorporates the temporal dependency graph into a self-attention layer of a transformer. The temporal dependency understanding system utilizes the modified transformer to perform downstream document understanding tasks that are informed by temporal information. For instance, the temporal dependency understanding system utilizes the modified transformer to perform time-sensitive question answering tasks or temporal natural language intent queries for a text document.

Moreover, in one or more embodiments, the temporal dependency understanding system utilizes a path reconstruction loss (e.g., path prediction) to incorporate longer range dependencies during training. For example, the temporal dependency understanding system utilizes the path reconstruction loss to focus on entity pairs (e.g., within a text document) with relationships, rather than those without relationships. Specifically, the temporal dependency understanding system utilizes the path reconstruction loss to jointly learn a relationship label between a pair of nodes as well as a shortest dependency path linking the pair of nodes. By so doing, the temporal dependency understanding system is able to recover from structure prediction errors between nodes by learning an alternative path reconstructed through multi-hop connections.

As mentioned above, conventional document understanding systems suffer from inaccuracy and operational inflexibility. For example, conventional document understanding systems tend to suffer from computational inaccuracy due to the complexities of natural language. For instance, the same word often has different meanings, and in some instances, the same meaning is expressed in different sentence structures. Further, text documents often include confounded modalities (e.g., events that are certain to happen versus the ones that might happen), and event ambiguities (e.g., agreeing to terms of a contract versus signing a contract). Because of these issues some conventional document understanding systems suffer from accurately understanding temporal cues within text of a document. For instance, conventional document understanding systems often incorrectly understand the relationship between the same word with different meaning (e.g., depending on context or sentence structure) and often identify the incorrect temporal relationships between words in a text document.

Further, conventional document understanding systems further suffer from inaccuracy due to the need for complete annotation of all event pairs within a text document. For instance, conventional document understanding systems typically require complete annotation to achieve precise temporal localization. However, without complete annotation, some conventional document understanding systems fail to identify or incorrectly identify temporal relationships within a text document. Thus, many conventional document understanding systems are prone to fail to provide response to temporal queries regarding a text document because of the tediousness and computational costs associated with complete annotation.

Moreover, because complete annotation is a computationally exhausting and tedious task, conventional document understanding systems are typically limited to annotating short passages or adjacent sentences (e.g., especially in situations for annotating long text documents). Accordingly, conventional document understanding systems (e.g., especially in the situation of long documents), typically suffer from an inaccurate understanding of the document due to a lack of complete annotation.

In addition to the accuracy issues, conventional document understanding systems further suffer from operational inflexibility. For example, conventional document understanding systems are unable to adapt to longer documents or documents with more complex temporal relationships. For instance, conventional systems often suffer from global inconsistencies in predictions due to relation transitivity and forced annotation of vague relations. Accordingly, conventional document understanding systems are often unable to adapt to a wide variety of different document types with more complex relationships (e.g., temporal relationships that span many different pages of text).

As suggested, one or more embodiments of the temporal dependency understanding system provides advantages over conventional document understanding systems. For example, in one or more embodiments, the temporal dependency understanding system improves accuracy over prior systems. For example, as mentioned, in some embodiments the temporal dependency understanding system utilizes a document understanding pipeline that generates a structural vector, a syntactic vector, and a semantic vector (e.g., and further combining the vectors to generate a multi-dimensional vector). In doing so, the temporal dependency understanding system accurately maps words with different meanings and words with the same meaning expressed in different sentence structures and overcomes complexities of natural language typically faced by conventional document understanding systems. Specifically, in some embodiments the structural vector, the syntactic vector, and the semantic vector capture important properties of the text document. The temporal dependency understanding system utilizes an iterative deep graph learning model to generate an initial dependency graph along with an adjacency matrix to map out relationships between events within the text document based on the structural vector, the syntactic vector, and the semantic vector.

Moreover, in some embodiments, the temporal dependency understanding system utilizes a convolutional graph neural network to further extract information from an initial dependency graph to generate an entity-level relation matrix. Accordingly, in some embodiments, with both the adjacency matrix and the entity-level relation matrix, the temporal dependency understanding system generates a temporal dependency graph that accurately contains the structure and relationships of the text document.

As mentioned, in some embodiments the temporal dependency understanding system generates the adjacency matrix and the entity-level relation matrix by reasoning over long-range multi-hop dependencies while maintaining global consistency of temporal ordering for inter-dependent events. Thus, because the temporal dependency understanding system generates the temporal dependency graph from the adjacency matrix and the entity-level relation matrix, the temporal dependency graph reduces or eliminates the issues typically faced by conventional document understanding systems (e.g., confounded modalities and event ambiguities).

Moreover, in one or more embodiments, the novel document understanding pipeline, allows for the temporal dependency understanding system to accurately identify temporal relationships in long text documents (e.g., hundreds or thousands of pages). Specifically, in some embodiments, the temporal dependency understanding system avoids the need for complete annotation of a text document by generating the temporal dependency graph from the entity-level relation matrix and the adjacency matrix. For instance, the temporal dependency graph accurately contains the structure and temporal relationships of the text document.

Additionally, in some embodiments the temporal dependency understanding system further improves upon operational flexibility. For example, as described above, in some embodiments the temporal dependency understanding system utilizes the document understanding pipeline to generate a temporal dependency graph that adapts to a wide variety of different document types (e.g., short documents or long documents) and accurately identifies complex temporal relationships within the documents.

Moreover, in one or more embodiments, the temporal dependency understanding system further improves upon operational flexibility by determining a path reconstruction loss from the entity-level relation matrix and the adjacency matrix. In particular, the path reconstruction loss assists the temporal dependency understanding system in focusing on entity pairs (e.g., within a text document) with relationships, rather than those without relationships. As such, the path reconstruction loss determined by the temporal dependency understanding system further enhances the flexibility to adapt to short or long range event relationships within a document.

Furthermore, in one or more embodiments, the temporal dependency understanding system further improves upon operational flexibility by utilizing a temporally-informed self-attention layer within a transformer neural network. Specifically, in such embodiments, the temporal dependency understanding system utilizes a time transformer to generate an output prediction from a temporal dependency graph for utilization in downstream document understanding tasks. For instance, in some such embodiments, the temporal dependency understanding system improves operational flexibility by incorporating temporal and structural contextual information into document understanding tasks.

Additional detail regarding the document understanding system will now be provided with reference to the figures. For example, FIG. 1 illustrates a schematic diagram of an exemplary system environment ("environment") 100 in which a temporal dependency understanding system 102 operates in one or more embodiments. As illustrated in FIG. 1, the environment 100 includes server(s) 106, a network 108, storage device(s) 120, and client devices 110*a*-110*n*.

Although the environment 100 of FIG. 1 is depicted as having a particular number of components, the environment 100 is capable of having any number of additional or alternative components (e.g., any number of servers, client devices, or other components in communication with the temporal dependency understanding system 102 via the network 108). Similarly, although FIG. 1 illustrates a particular arrangement of the server(s) 106, the network 108, storage device(s) 120, and the client devices 110*a*-110*n*, various additional arrangements are possible.

The server(s) 106, the network 108, storage device(s) 120, and the client devices 110*a*-110*n* are communicatively coupled with each other either directly or indirectly (e.g., through the network 108 discussed in greater detail below in relation to FIG. 13). Moreover, the server(s) 106 and the client devices 110*a*-110*n* include one of a variety of computing devices (including one or more computing devices as discussed in greater detail with relation to FIG. 13).

As illustrated in FIG. 1, the environment 100 includes the server(s) 106. The server(s) 106 generates, tracks, stores, processes, receives, and transmits electronic data, including digital documents. In one or more embodiments, a digital document includes an electronic file or record that contains information in a digital format. For example, digital documents include text documents, spreadsheets, presentations, images, audio files, video files, or combinations of different types of content (e.g., text and images). In one or more embodiments, one or more client devices create or edit digital documents using various software applications for storing, sharing, and/or accessing using digital devices and networks. Additionally, in one or more embodiments, multimodal digital documents include digital documents with more than one presentation type of data (e.g., text and images, text and video).

For example, the server(s) 106 receive or monitor interactions across the client devices 110*a*-110*n*. In some implementations, the server(s) 106 transmit content to the client devices 110*a*-110*n* to cause the client devices 110*a*-110*n* to display content associated with digital documents. For example, the server(s) 106 present a digital document to client device 110*a* and extract information or understanding from a digital document based on the client devices 110*a*-110*n* selection of content within the document.

In some embodiments, the server(s) 106 communicates with the client devices 110*a*-110*n* to transmit and/or receive content via the network 108. In some embodiments, the server(s) 106 comprises a distributed server where the server(s) 106 include a number of server devices distributed across the network 108 and located in different physical locations. For example, the server(s) 106 comprise a content server, an application server, a communication server, a web-hosting server, a multidimensional server, or a machine learning server. In additional embodiments, the server(s) 106 further access and utilize the storage device(s) 120 to store and retrieve information including information related to digital documents, images, audio files, and multi-media content.

As shown, the server(s) 106 includes a document understanding system 104, which includes the temporal dependency understanding system 102. Additionally, the server(s) 106 includes all, or a portion of, the temporal dependency understanding system 102. For example, the temporal dependency understanding system 102 operates on the server(s) 106 to access digital documents, generate a temporal dependency graph, and utilize the temporally informed self-attention transformer 122 to perform a document understanding task. The server(s) 106 further provide the results of the foregoing to the client devices 110*a*-110*n*. Further, as shown, the temporal dependency understanding system 102 includes a temporally-informed self-attention transformer 122, an iterative deep graph learning model 124, and a graph neural network 126.

As shown in FIG. 1, the illustrated system includes the client devices 110*a*-110*n*. In some embodiments, the client devices 110*a*-110*n* include, but are not limited to, mobile devices (e.g., smartphones, tablets), laptop computers, desktop computers, or any other type of computing devices, including those explained below in reference to FIG. 13. In some embodiments, client devices 110*a*-110*n* are operated by a user to perform a variety of functions via respective client applications 112*a*-112*n*. The client devices 110*a*-110*n* include one or more applications (e.g., the client applications 112*a*-112*n*) that access, edit, modify, store, and/or provide for display, digital documents. For example, in some embodiments, the client applications 112*a*-112*n* include a software application installed on the client devices 110*a*-110*n*. In other cases, however, the client applications 112*a*-112*n* include a web browser or other application that accesses a software application hosted on the server(s) 106.

In one or more embodiments, the temporal dependency understanding system 102 is implemented in whole, or in part, by the individual elements of the environment 100. Indeed, as shown in FIG. 1, the temporal dependency understanding system 102 is implemented by the server(s) 106 and/or at the client devices 110*a*-110*n*. In particular embodiments, the temporal dependency understanding system 102 on the client devices 110*a*-110*n* comprises a web application, a native application installed on the client devices 110*a*-110*n* (e.g., a mobile application, a desktop application, a plug-in application, etc.), or a cloud-based application where part of the functionality is performed by the server(s) 106.

In additional or alternative embodiments, the temporal dependency understanding system 102 on the client devices 110*a*-110*n* represents and/or provides the same or similar functionality as described herein in connection with the temporal dependency understanding system 102 on the server(s) 106. In some implementations, the temporal dependency understanding system 102 on the server(s) 106 supports the temporal dependency understanding system 102 on the client devices 110*a*-110*n* (e.g., as shown, the client applications 112*a*-112*n* includes the document understanding system 104, which further includes the temporal dependency understanding system 102).

For example, in some embodiments, the server(s) 106 select content and/or train one or more machine learning models described herein. The temporal dependency understanding system 102 on the server(s) 106 provides temporal dependency graphs, and/or the one or more trained machine learning models to the temporal dependency understanding system 102 and/or the document understanding system 104 on the client devices 110*a*-110*n* for implementation. Accordingly, in one or more embodiments the client devices 110*a*-110*n* utilize the one or more trained machine learning models to generate temporal dependency graphs or outputs from transformers (e.g., time transformers with temporally-informed self-attention layers) informed by temporal dependency graphs. In some implementations, the server(s) 106 train machine learning models and also implement the trained machine learning models.

In some embodiments, the temporal dependency understanding system 102 includes a web hosting application that allows the client devices 110*a*-110*n* to interact with content and services hosted on the server(s) 106. To illustrate, in one or more implementations, the client devices 110*a*-110*n* access a web page or computing application supported by the server(s) 106. The client devices 110*a*-110*n* provide input to the server(s) 106 (e.g., selected document). In response, the temporal dependency understanding system 102 on the server(s) 106 utilize the trained machine learning models to generate a temporal dependency graph or a document understanding task utilizing the temporally informed self-attention transformer 122. The server(s) 106 provide the temporal dependency graph or the results of the document understanding task to the client devices 110*a*-110*n*.

In some embodiments, the environment 100 has a different arrangement of components and/or has a different number or set of components altogether. For example, in certain embodiments, the client devices 110*a*-110*n* communicate directly with the server(s) 106, bypassing the network 108. As another example, the environment 100 includes a third-party server comprising a content server and/or a data collection server.

Figure 2:
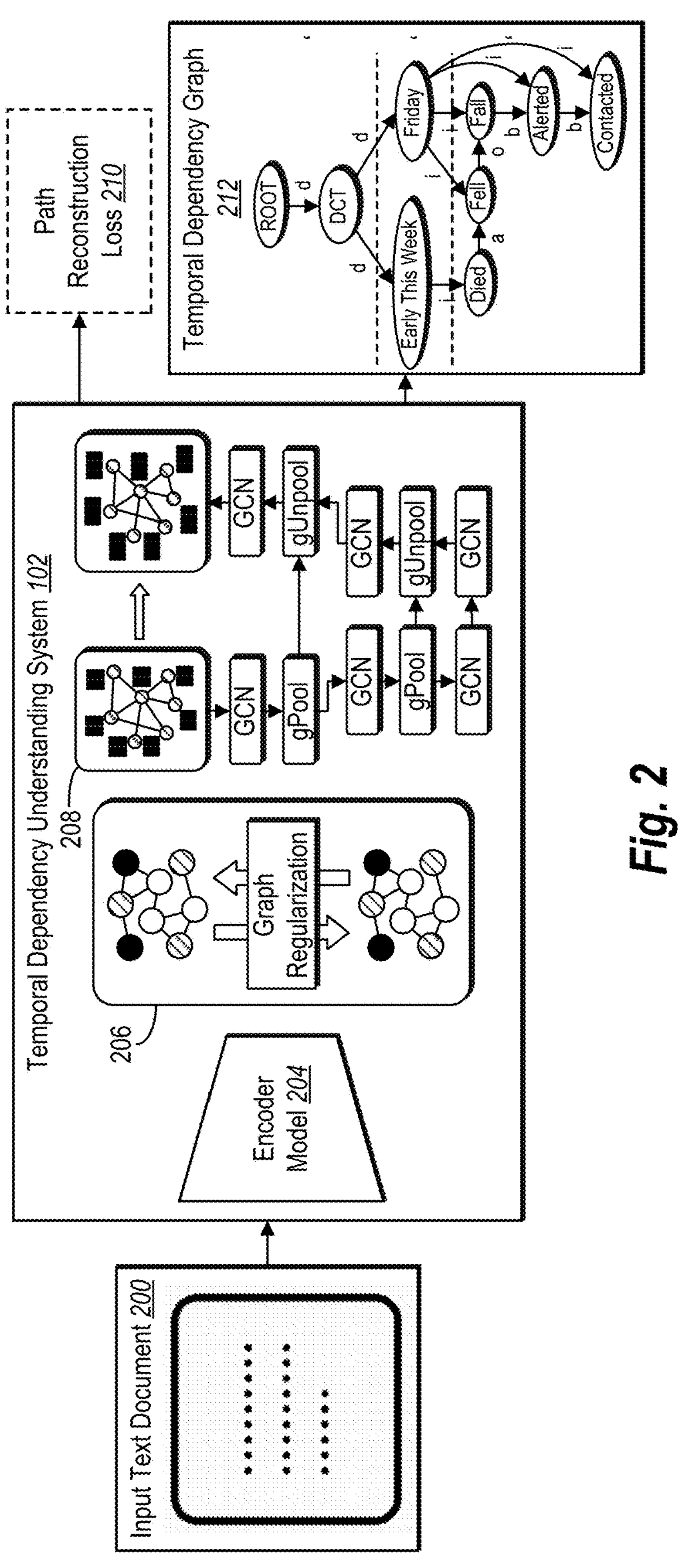
FIG. 2 illustrates an overview diagram of the temporal dependency understanding system generating a temporal dependency graph in accordance with one or more embodiments.

As previously mentioned, in one or more embodiments, the temporal dependency understanding system 102 performs digital document content understanding by generating temporal dependency graphs. For instance, FIG. 2 illustrates an overview diagram of the temporal dependency understanding system 102 generating temporal dependency graphs in accordance with one or more embodiments. Greater detail of the process of the temporal dependency understanding system 102 generating temporal dependency graphs briefly described with reference to FIG. 2 are described in greater detail with reference to FIGS. 3-5.

FIG. 2 shows an overview of the workflow utilized by the temporal dependency understanding system 102 to perform temporal dependency parsing to generate temporal dependency graphs. The temporal dependency understanding system 102 extracts token level features from the text document 200 utilizing the encoder model 204. As explained in greater detail with relation to FIG. 3, the temporal dependency understanding system 102 enriches the features utilizing three graph networks that encode structural, syntactic, and semantic relationships. The temporal dependency understanding system 102 performs iterative deep graph learning 206 over the time expression and event entities to learn an initial dependency structure as described in greater detail with relation to FIG. 4. The temporal dependency understanding system 102 passes the initial dependency structure through a Graph U-net 208 to allow the model to incorporate longer range dependencies before predicting the final temporal dependency graph and relationships as explained in greater detail with relation to FIG. 5. The temporal dependency understanding system 102 also learns parameters with a path prediction loss 210 as described in greater detail with relation to FIG. 5.

More specifically, as shown in FIG. 2, the temporal dependency understanding system 102 receives a text document 200. In particular, the text document 200 includes a file with various textual elements. For example, in one or more embodiments, the text document 200 contains textual descriptions of occurrences or events, with relationships occurring between occurrences or events. For instance, in some embodiments the text document 200 typically includes various events, time expressions, processes, and procedures described by the textual elements. To illustrate, the text document 200 includes documents such as contracts, recipes, instruction manuals, and other types of documents that contain complex relationships, procedures, and conditions. Furthermore, in some embodiments the text document 200 includes anywhere from a couple of pages to thousands of pages.

As further shown in FIG. 2, the temporal dependency understanding system 102 includes an encoder model 204, an iterative deep graph learning model 206, and a convolutional graph neural network 208. For example, FIG. 2 shows temporal dependency understanding system 102 utilizing the encoder model 204 to generate a structural vector, a syntactic vector, and a semantic vector from the text document 200. Details about generating a structural graph, a syntactic graph, and a semantic graph from the text document 200 are given below in the description of FIG. 3. From the structural vector, a syntactic vector, and a semantic vector, the temporal dependency understanding system 102 utilizes an iterative deep graph learning model and a graph convolutional neural network to generate a temporal dependency graph 212. Specific details regarding the document understanding pipeline (e.g., the iterative deep graph learning model and the graph convolutional neural network) are given below in the description of FIGS. 3, 4, and 5.

As shown in FIG. 2, the temporal dependency understanding system 102 processes the text document 200 to generate the temporal dependency graph 212. For instance, the temporal dependency understanding system 102 generates the temporal dependency graph 212 to include a graph topology. Graph topology includes an organization of nodes corresponding to different text. A graph topology includes an organization of nodes where each node reflects data corresponding to a text phrase. For example, a graph topology includes an organization whose embeddings correspond to text phrases that are stored in corresponding nodes of the graph topology. In particular, a “text-phrase node” refers to a node of a graph topology that corresponds to a text phrase. Similarly, a “query node” refers to a node of a graph topology that corresponds to a query.

Specifically, as discussed, FIG. 2 shows the temporal dependency understanding system 102 generating the temporal dependency graph 212. For instance, the temporal dependency understanding system 102 generates the temporal dependency graph 212 from an entity-level relation matrix and an adjacency matrix generated from the document understanding pipeline. In particular, the temporal dependency graph 212 represents a mapping of relational probabilities in the adjacency matrix and the entity-level matrix. For instance, the temporal dependency graph 212 contains the temporal relationships between entities (e.g., nodes) in a graph structure. Additional details regarding generating the temporal dependency graph 212 are given below in the description of FIGS. 3, 4, and 5.

As also shown, in some embodiments, the temporal dependency understanding system 102 utilizes the document understanding pipeline to generate a path reconstruction loss 210. In one or more embodiments, the temporal dependency understanding system 102 generates the path reconstruction loss 210 utilizing a loss function and then modifies parameters of one or more models of the document understanding pipeline. Thus, the temporal dependency understanding system 102 utilizes the path reconstruction loss 210 to train the document understanding pipeline to generate accurate output predictions regarding paths or sequences of nodes or edges within a graph (e.g., a graph generated by the model).

In some embodiments, the temporal dependency understanding system 102 utilizes the path reconstruction loss 210 to cause the document understanding pipeline to pay more attention during learning to entity pairs with relationships rather than entity pairs without relationships. For instance, in some embodiments node pairs do not have a corresponding ground truth or a temporal relation. Rather than causing the model to disperse its attention in learning node pairs without relationships, the temporal dependency understanding system 102 utilizes the path reconstruction loss 210 to focus on entity pairs with relationships. Additional details regarding the path reconstruction loss 210 are given below in the description of FIG. 5.

As mentioned above, the temporal dependency understanding system 102 generates a structural vector, a syntactic vector, and a semantic vector to capture contextual/temporal information from a text document. For example, FIG. 3 illustrates an example of the temporal dependency understanding system 102 generating a multi-dimensional vector from the structural vector, the syntactic vector, and the semantic vector in accordance with one or more embodiments.

FIG. 3 shows the temporal dependency understanding system 102 receiving a text document 200. For instance, the text document 200 includes text describing one or more events. An event includes a happening or occurrence described within the text document 200. Further, an event refers to a specific occurrence or situation that triggers a particular action or outcome. More specifically, an event is associated with, in one or more implementations, fleshing out terms or conditions contained within the text document 200. For instance, for a contract, an event includes the buying/selling of goods, payment being due upon delivery, the date that triggers late payments, or a failure to make a payment. For a recipe, an event includes pre-heating the oven to 350 degrees, adding eggs, adding milk, mixing various ingredients, etc.

Moreover, in some embodiments the text document 200 further includes related events. For example, related events include two or more connected events. In particular, for the illustration above, the date to remit payment is connected to a failure to remit payment. Accordingly, in some embodiments the temporal dependency understanding system 102 identifies event pairs (e.g., related events) within the text document 200.

Additionally, in some embodiments the text document 200 also includes time expressions (e.g., TIMEX). For example, a time expression includes temporal information within natural language text (e.g., the text document 200). Moreover, in some embodiments, the time expressions include representations of dates, times, durations, and other temporal expressions (e.g., approximately).

As shown in FIG. 3, the temporal dependency understanding system 102 utilizes an encoder 302 to process the text document 200. For example, the encoder 302 includes a BERT encoder (bidirectional encoder representations from transformers). In some embodiments, the BERT encoder includes BERT-GCN (graph convolutional network), WR-GCN (weighted relation), and HyperGraph convolutional layers respectively.

For example, the temporal dependency understanding system 102 encodes the text document 200 by representing the document as D, defined by a sequence of n tokens $[x_1, \ldots, x_n]$. Further, in some embodiments the document includes a sequence of m sentences $[s_1, \ldots, s_m]$. Moreover, in some embodiments each document has a set of p events $E=[e_1, \ldots, e_p]$ and q timexes $T=[t_1, \ldots, t_q]$, where $p, q \leq n$. Further, in some embodiments the creation date of the document is represented by timestamp $t_{DCT}$.

Moreover, in some embodiments as part of processing the text document 200 via the encoder 302, the temporal dependency understanding system 102 generates vectors. In some embodiments, a vector includes an embedding. In one or more embodiments, embedding includes a numerical or vector representation of a variable. For example, an embedding includes a numerical or vector representation of a word, a query, or a text phrase from a passage of text. Indeed, a word embedding includes an embedding that represents an individual word (e.g., a word from a text-phrase or from a query). Further, a text-phrase embedding includes an embedding that represents a text phrase. Similarly, a query embedding includes an embedding that represents a query.

Additionally, in one or more embodiments, the temporal dependency understanding system 102 utilizes a neural network model to generate embeddings for tokens of the text document 200. For example, a neural network includes a machine learning model tuned (e.g., trained) based on inputs to approximate unknown functions. In particular, the neural network includes a model of interconnected artificial neurons (e.g., organized in layers) that communicate and learn to approximate complex functions and generate outputs based on a plurality of inputs provided to the model. For instance, the neural network includes one or more machine learning algorithms. In addition, a neural network includes an algorithm (or set of algorithms) that implements deep learning techniques that utilize a set of algorithms to model high-level abstractions in data. To illustrate, a neural network includes a convolutional neural network, a recurrent neural network, a generative adversarial neural network, and/or a graph neural network (i.e., a neural network that comprises learned parameters for analyzing a graph topology).

For example, in one or more embodiments the temporal dependency understanding system 102 specifically implements a language embedding model. For instance, the language embedding model includes a computer algorithm or model that generates embeddings associated with text. In particular, a language embedding model includes a computer algorithm that analyzes text (e.g., a word or a grouping of words, such as a text phrase) and generates one or more corresponding embeddings. Specifically, the language embedding model includes learning algorithms, such as the BERT model, the GloVe model, or the ELMo model.

In one or more implementations, the temporal dependency understanding system 102 utilizes a pre-trained BERT language model to generate the embeddings for each token as follows: $w_1, w_2, \ldots, w_n = \text{BERT}(|x_1, x_2, \ldots, x_n|)$, where $w_i$ is the embedding of the token $x_i$. Further, in some embodiments where document sequence is longer in length, the temporal dependency understanding system 102 uses a sliding window encoding technique to encode the whole document sequence. In some embodiments, the temporal dependency understanding system 102 averages the embeddings of overlapping tokens of different windows to obtain the final representations.

As shown in FIG. 3, the temporal dependency understanding system 102 utilizes a structural graph 304, a syntactic graph 306, and a semantic graph 308 to generate various vectors (e.g., embeddings) from the tokens of the text document 200. In particular, FIG. 3 shows the temporal dependency understanding system 102 generating a structural vector 310 from the structural graph 304, a syntactic vector 312 from the syntactic graph 306, and a semantic vector 314 from the semantic graph 308.

As mentioned, the temporal dependency understanding system 102 utilizes the structural graph 304 to generate the structural vector 310. In one or more embodiments, the structural graph 304 includes the hierarchical textual structure formed by grouping word tokens into lists of sentences that bind together. Moreover, edges of the structural graph 304 encode one or more of the following relationships: document-sentence affiliation (e.g., connects each document-node to a sentence-node), sentence-word affiliation (e.g., joins each sentence node to its constituent word nodes), sentence-sentence adjacency, or word-word adjacency (e.g., which preserves sequential ordering for consecutive sentence and word nodes).

Furthermore, in some embodiments, the structural graph 304 includes sentence node embedding $s_i$, which are obtained by passing sentences through a pre-trained SentenceBERT model. Further, in some embodiments, the structural graph 304 further includes a document node embedding D, which is determined as the average of all sentence embeddings. To illustrate, the average of all sentence embeddings is represented as $$\left(D = \sum_i^m v_i\right).$$

Moreover, in some embodiments, the temporal dependency understanding system 102 utilizes a pre-trained SentenceBERT model to generate the structural graph 304 as described in Reimers, N., et al., (2019), *Sentence-BERT: Sentence embeddings using Siamese BERT-networks*, In *Proceedings of the* 2019 *Conference on Empirical Methods in Natural Language Processing and the* 9*th International Joint Conference on Natural Language Processing* (*EMNLP-IJCNLP*), 3982-3992, Hong Kong, China: Association for Computational Linguistics, which is fully incorporated by reference herein.

As shown, the temporal dependency understanding system 102 generates the structural vector 310 from the structural graph 304. In one or more embodiments, the structural vector 310 includes a representation of a specific portion of the structural or topological aspects of a graph (e.g., the temporal dependency understanding system 102 generates multiple structural vectors for each entity of the graph). For instance, the temporal dependency understanding system 102 generates the structural graph 304 from the text document 200 and further generates the structural vector 310 from the structural graph 304.

As shown, the temporal dependency understanding system 102 utilizes the syntactic graph 306 to generate a syntactic vector 312. For example, the syntactic graph 306 includes syntactic cues, and the temporal dependency understanding system 102 generates the syntactic graph 306 utilizing a pre-trained transformer model (e.g., which captures implicit syntactic information and is trained with deeper layers for handling cases involving long-distance dependency information).

Further, in some embodiments, the syntactic graph 306 ($G_{syn}$) includes separate nodes to represent each constituent word ($w_i$) in the text document 200. Further, in some instances, for each document, there is also a set of coreference clusters $\{C_1, C_2 \ldots C_u\}$ which refers to the same entities in the graph. Moreover, in some embodiments, the syntactic graph 306 includes four types of directed edges as shown:

$$\varepsilon_{syn}(i,j)=\{\text{dependency if}(w_i,w_j)\in\xi,\text{reversion if}(w_j,w_i)\in\xi,\text{coreference if } w_i,w_j\in C_u,\text{self-loop if } i==j,\text{root-adjacency if}$$

$$w_i == S^r_{w_i},\ w_j == S^r_{w_i},$$

$\&S_{w_i}\rightarrow S_{w_j}$.

In the above notation, $\xi$ represents the set of syntactic dependency arcs inside sentences, $S_{w_i}^r$ denotes root of the sentence in which the word $w_i$ belongs, and $S_{w_i} \rightarrow S_{w_j}$ represents whether sentences containing words $w_i$ and $w_j$ are adjacent.

Furthermore, in one or more embodiments, the first two edge types are introduced to allow information flow along and against syntactic arcs between intra-sentential dependency relations to enrich contextually learned embeddings of each word. Moreover, in some embodiments the temporal dependency understanding system 102 connects parse tree roots of adjacent sentences to encode document level long-range syntactic relatedness between sentences. Further, in some embodiments the temporal dependency understanding system 102 adds an undirected edges between word nodes if both belong to the same co-reference cluster.

Additionally, in some embodiments, the temporal dependency understanding system 102 adds self-loop edges for better message passing iterations. Moreover, in some embodiments, the temporal dependency understanding system 102 instantiates the syntactic graph 306 as a gated variant of weighted relation graph convolutional network (WR-GCN) with k-layers. For instance, the temporal dependency understanding system 102 utilizes WR-GCN to model diverse relations in a heterogenous graph by treating different types of edges with unequal weights assigned during message passing.

As shown in FIG. 3, the temporal dependency understanding system 102 generates the syntactic vector 312 from the syntactic graph 306. For instance, the syntactic vector 312 includes a representation of a specific portion of the syntactic or grammatical relationships between elements in a graph-structured dataset (e.g., the temporal dependency understanding system 102 generates multiple structural vectors for each component of the graph). For instance, the temporal dependency understanding system 102 generates the syntactic graph 306 from the text document 200 and further generates the syntactic vector 312 from the syntactic graph 306.

As shown, the temporal dependency understanding system 102 utilizes the semantic graph 308 to generate the semantic vector 314. For example, the temporal dependency understanding system 102 generates the semantic graph 308 by utilizing semantic role labeling (SRL). For instance, the temporal dependency understanding system 102 utilizes SRL which parses text sequences of the text document 200 to recognize predicate-argument structure in sentences to answer who did what and when.

Further, in some embodiments, anchoring verb events to their temporal argument spans extracted from semantic parsing helps infer event relationships with their associated time expressions. For instance, in some such embodiments the temporal dependency understanding system 102 complements the anchoring of verb events to their temporal argument spans with discourse features in the form of rhetorical structure theory (RST) connections to help leverage long-range document level interactions between phrase units. Moreover, in some embodiments, the temporal dependency understanding system 102 identifies background-foreground events. In some such embodiments, the temporal dependency understanding system 102 further improves temporal relationship parsing.

Furthermore, in some embodiments the temporal dependency understanding system 102 utilizes document-level RST parser to organize contiguous semantic text spans of a document into a hierarchical dependency structure labeled with their rhetorical relations. For instance, the temporal dependency understanding system 102 utilizes the document-level RST parser as described in Shi, K., et al., (2020), *An end-to-end document-level neural discourse parser exploiting multi-granularity representations, arXiv preprint arXiv:* 2012.11169, which is fully incorporated by reference herein.

In one or more embodiments, the temporal dependency understanding system 102 generates the semantic graph 308 which includes individual nodes for each constituent word $w_i$ in the text document 200. Further, in some embodiments, the semantic graph 308 further includes discourse units and temporal arguments that span several word tokens $\{w_1, w_2, \ldots w_k\}$. Moreover, in some embodiments the temporal dependency understanding system 102 adds directed edge connections between (1) event verb predicate-temporal argument edge ($\varepsilon_t$) such that ($w_e \rightarrow \{w_1, w_2, \ldots w_k\} \in \varepsilon_t$) and (2) rhetorical pair edges ($\varepsilon_d$) labelled by the type of rhetorical relation ($\{w_1, w_2 \ldots w_i\} \rightarrow \{w_1, w_2, \ldots w_j\} \in \varepsilon_d$).

In some embodiments, $\varepsilon = \{w_e \rightarrow w_e \ldots w_k\} \in \varepsilon_t; \{w_1, \ldots w_i\} \rightarrow \{w_1, \ldots w_j\} \in \varepsilon_d$. The notation indicates the nature of edge connections in the semantic graph 308 extend beyond pairwise interactions as in some embodiments, edges connect to one or more word nodes. For instance, the temporal dependency understanding system 102 generates the semantic graph 308 as a hypergraph where an edge joins an arbitrary number of vertices. Furthermore, in some instances the temporal dependency understanding system 102 generates the semantic graph 308 as $G_{sem} = (v, \varepsilon, W)$, where v is the set of all word nodes $w_i$ and $\varepsilon$ is the subset of hyperedges such that $\varepsilon = \varepsilon_t \cup \varepsilon_d$. Moreover, in some embodiments, each hyperedge e is assigned a positive weight corresponding to the type of edge relation and is stored in a diagonal matrix $W \in \Re^{|\varepsilon| \times |\varepsilon|}$. Further, in some embodiments, the temporal dependency understanding system 102 learns the semantic graph 308 using hypergraph convolution layers to obtain discriminative node embeddings for each word node.

As shown, the temporal dependency understanding system 102 generates the semantic vector 314 from the semantic graph 308. In particular, the semantic vector 314 includes a representation of a specific portion of meaning or semantics of nodes and edges in a semantic graph 308 (e.g., the temporal dependency understanding system 102 generates multiple semantic vectors for each component of the graph).

As shown in FIG. 3, the temporal dependency understanding system 102 performs an act 316 of combining the structural vector 310, the syntactic vector 312, and the semantic vector 314. These token representations are enriched with slightly enhanced variants of the structural ($G_{str}$), syntactic ($G_{syn}$) and semantic ($G_{sem}$) graphs.

For instance, the temporal dependency understanding system 102 uses BERT-GCN (Lin, Y., et al., (2021), *BertGCN: Transductive Text Classification by Combining GCN and BERT, arXiv preprint arXiv:* 2105.05727, which is fully incorporated herein by reference) to combine contextual and structural graph features, the addition of co-reference relationships to the syntactic graph, and the use of a hypergraph convolution to allow for token level features in the semantic graph.

For example, the temporal dependency understanding system 102 generates the multi-dimensional vector 318 by concatenating the node embeddings learned from the structural graph 304, the syntactic graph 306, and the semantic graph 308. In some such embodiments, the learned representation for each entity node includes a combination of the time expression, the event, and the document creation date.

To illustrate, the temporal dependency understanding system 102 where only the represents the multi-dimensional vector 318 as:

$$F(w_i)=g_i^{str}\oplus g_i^{syn}\oplus g_i^{sem}$$

where only the enriched node embeddings for each word are retained (e.g., embeddings that include the time expression, event, and document creation date).

As mentioned, in one or more embodiments, the temporal dependency understanding system 102 generates an initial dependency graph structure and a corresponding adjacency matrix. For example, FIG. 4 illustrates the temporal dependency understanding system 102 utilizing an iterative deep graph learning model in accordance with one or more embodiments.

Figure 4:
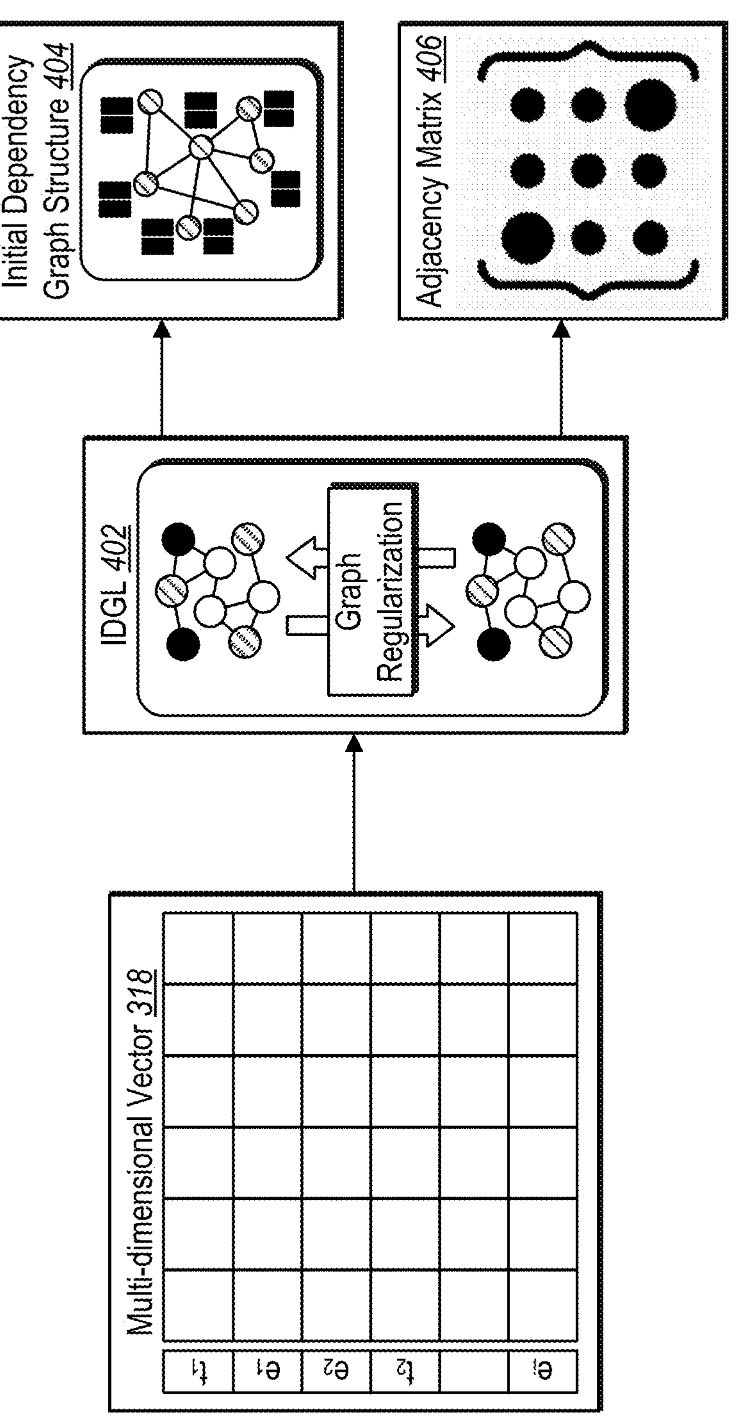
FIG. 4 illustrates an example diagram of the temporal dependency understanding system generating an initial dependency graph structure and a corresponding adjacency matrix in accordance with one or more embodiments.

As shown in FIG. 4, in one or more embodiments, the temporal dependency understanding system 102 further processes a multi-dimensional vector 318 with an iterative deep graph learning model 402. For example, the iterative deep graph learning model 402 includes a model iteratively trained on a graph-structured dataset. For instance, during each iteration of running the iterative deep graph learning model 402, the model updates representations of nodes and edges based on the current state of the graph and additional information from surrounding nodes or edges. To illustrate, the temporal dependency understanding system 102 utilizes the iterative deep graph learning model 402 to dynamically learn an initial dependency graph structure from the multi-dimensional vector 318.

Further, as shown, the temporal dependency understanding system 102 by utilizing the iterative deep graph learning model 402, generates an initial dependency graph structure 404. For example, the temporal dependency understanding system 102 generates the initial dependency graph structure 404 from identified events within the text document. In particular, the initial dependency graph structure 404 includes an indication of the temporal or causal relationship between two or more events. For instance, the temporal dependency understanding system 102 extracts related events from the text document, determines the relationship between the related events and represents the relationship in a graph. Furthermore, the graph includes nodes (e.g., representing entities within the text document) and edges (e.g., representing relationships between entities)

In one or more embodiments, node representation includes data stored as part of a node. In particular, a node representation includes an embedding that corresponds to a variable and that is stored as part of a node. For example, a node representation includes an embedding, stored as part of a node, that corresponds to (i.e., represents) a query or a text phrase from a passage of text. In particular, a text-phrase node representation refers to a node representation associated with a text-phrase node. Similarly, a query node representation includes a node representation associated with a query node. Likewise, connected node representation refers to a node representation of a connected node.

For example, as mentioned, the temporal dependency understanding system 102 generates nodes for the initial dependency graph structure 404 based on elements within the text document. In particular, the temporal dependency understanding system 102 represents nodes as points in the dependency graph structure. Furthermore, the disclosed system labels the nodes to indicate which element the node corresponds with.

Additionally, a connected node includes a node that is associated with another node. In particular, a connected node includes a node that is connected to another node via an edge connection within a graph topology. For example, a connected node includes a query node or a text-phrase node that is connected to another node (i.e., either a query node or a text-phrase node) via an edge connection. In some embodiments, a connected node specifically refers to a node that is directly connected to another node (i.e., without any intermediate nodes)

As mentioned above, the temporal dependency understanding system 102 generates edges. For example, the temporal dependency understanding system 102 generates edges between the nodes based on properties of the text document. In particular, edges include links, arcs, or other connections represented by lines or arrows between nodes of the dependency graph structure. Furthermore, the edges include a label indicating a weight of the relationship between two nodes.

Further, in some embodiments an edge connection (or "edge") includes an association between nodes. In particular, an edge connection refers to a link or connection between one node and another node within a graph topology. For example, an edge connection includes a connection between two nodes indicating that at least one of the nodes will propagate information associated with that node to the other node. Thus, an edge connection includes an indicator that a node representation from a first node will be (or has been) applied to a node representation from a second node (and/or vice versa).

In one or more embodiments an edge weight (or "learned edge weight") includes a weighting value for propagating information across edge connections between nodes. In particular, an edge weight includes a value that determines the information shared between two nodes connected via an edge connection in a graph topology. For example, an edge weight includes a fraction value or percentage value that modifies the degree or amount that a node representation is propagated from one node to another node. In one or more embodiments, an edge weight includes a learned parameter obtained by training a model (e.g., a support identification graph neural network) to analyze a graph topology.

Moreover, as shown in FIG. 4, the temporal dependency understanding system 102 further generates an adjacency matrix 406 that corresponds with the initial dependency graph structure 404. In particular, the temporal dependency understanding system 102 generates the adjacency matrix 406 that represent pairwise relations between elements of the text document. For instance, the adjacency matrix 406 includes a square matrix that represents the initial dependency graph structure 404 by indicating which pairs of nodes are adjacent (e.g., which pairs of nodes are connected by an edge).

For instance, each row and column in the adjacency matrix 406 corresponds to a node in the initial dependency graph structure 404 and the entries within the matrix indicate whether an edge connects the corresponding pair of nodes. As an example, if there is an entry of '1' within a row x and a column y in the adjacency matrix 406, this indicates an edge connecting node x and node y. For weighted edges within a digital design graph, the entry within a row and column corresponds to the weight of the corresponding edge between nodes.

Moreover, in one or more embodiments, the temporal dependency understanding system 102 utilizes the iterative deep graph learning model 402 to dynamically learn the initial dependency graph structure 404 from the combined noise embeddings with a noise graph input feature matrix represented as $F \in R^{l+D}$. For instance, in some embodiments, the temporal dependency understanding system 102 utilizes the iterative deep graph learning model 402 to produce an implicitly learned graph structure $G^*=\{A^*, F, F_1\}$ with a jointly refined corresponding graph node embeddings F' with adjacency matrix A* by optimizing with respect to downstream link prediction task $F_1$ between entity nodes.

As mentioned above, in one or more embodiments, the temporal dependency understanding system 102 utilizes a convolutional graph neural network. For example, FIG. 5 illustrates the temporal dependency understanding system 102 utilizing a convolutional graph neural network to generate a temporal dependency graph in accordance with one or more embodiments.

Figure 5:
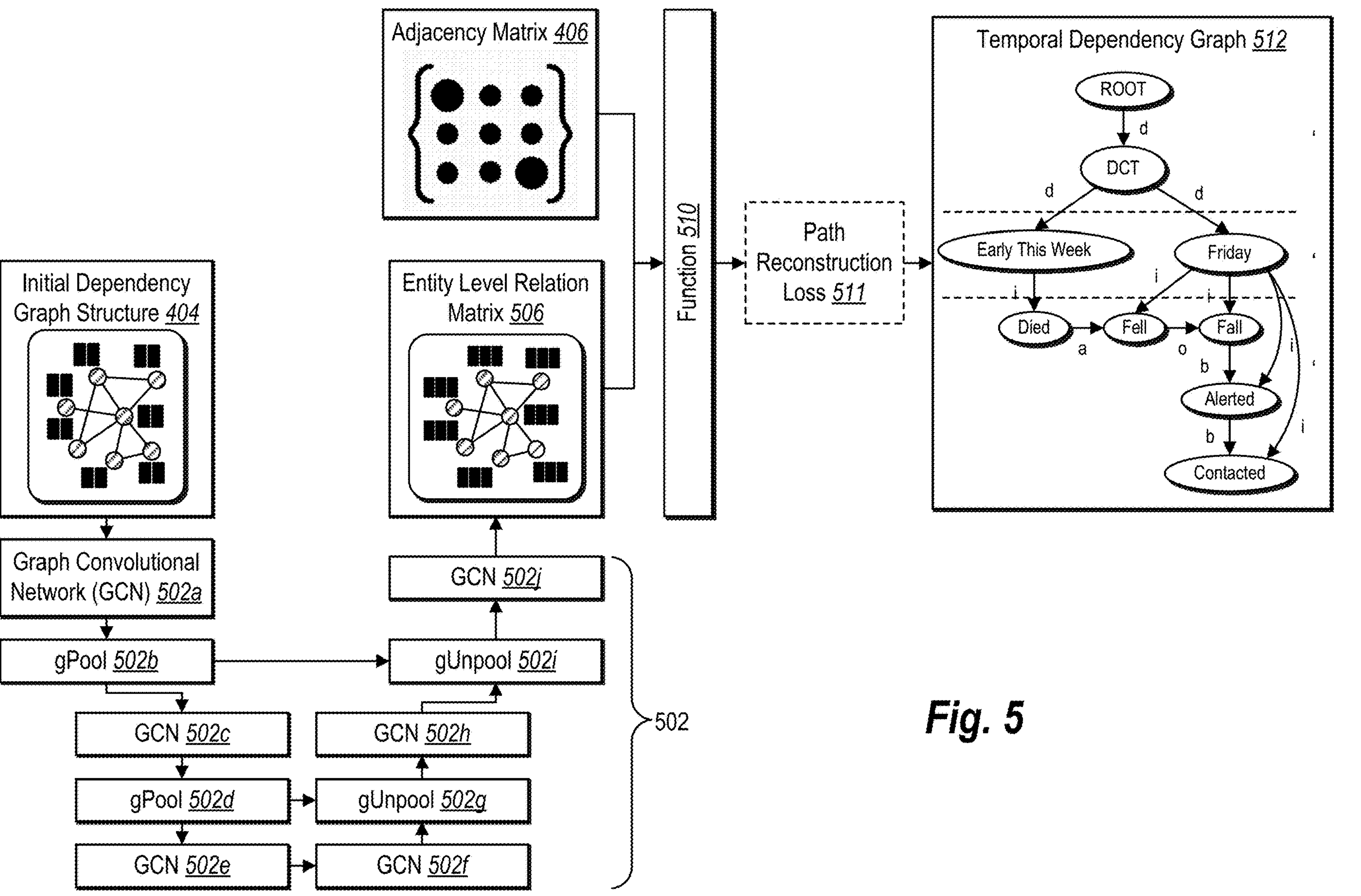
FIG. 5 illustrates an example diagram of the temporal dependency understanding system utilizing a convolutional graph neural network to generate a temporal dependency graph in accordance with one or more embodiments.

For example, FIG. 5 shows the temporal dependency understanding system 102 utilizing a convolutional graph neural network 502 which includes multiple components 502*a*-502*j*. In particular, FIG. 5 shows the temporal dependency understanding system 102 processing an initial dependency graph structure 404 with the convolutional graph neural network 502.

As mentioned, the temporal dependency understanding system 102 utilizes the convolutional graph neural network 502 to generate an entity-level relation matrix from the initial dependency graph structure 404. For example, the convolutional graph neural network 502 includes a network with architecture to perform graph-based learning tasks (e.g., by receiving graph or network-based data). For instance, the convolutional graph neural network 502 is based on convolutional neural networks (e.g., for image data), however convolutional graph neural networks are adapted to process graph-based data.

Further, as shown, the convolutional graph neural network 502 receives the initial dependency graph structure 404 as input, performs convolution operations at the node level, and has various upsampling, downsampling, and pooling layers. Moreover, the convolutional graph neural network 502 generates as an output, an entity-level relation matrix 506.

As shown in FIG. 5, the convolutional graph neural network 502 includes a graph convolutional network 502*a* (GCN), a gPool 502*b*, GCN 502*c*, gPool 502*d*, GCN 502*e*, GCN 502*f*, gUnpool 502*g*, GCN 502*h*, gUnpool 502*i*, and GCN 502*j*. For instance, the architecture in FIG. 5 shows a graph U-net architecture (e.g., a U-shaped graph encoder-decoder architecture). Further, as shown, the architecture includes two down-sampling graph pooling layers (e.g., gPool) and two up-sampling graph unpooling (gUnpool) layers with skip connections.

In one or more embodiments, gPool layers reduce the size of the graph to encode higher-order features. Further, in one or more embodiments, gUnpool layers restore the graph into its higher resolution structure to promote information exchange between entity pairs through an enlarged receptive field. Further, in some embodiments each graph pooling and unpooling layer is followed by a GCN layer to implicitly capture the topological information in the input graph (e.g., the initial dependency graph structure 404).

To illustrate, the temporal dependency understanding system 102 utilizes the convolutional graph neural network 502 with a graph U-net architecture as described in Gao, H., et al., (2019), *Graph U-Nets*, In *International Conference on Machine Learning*, 2083-2092, PMLR, which is incorporated by reference herein in its entirety.

As shown, the temporal dependency understanding system 102 generates the entity-level relation matrix 506 utilizing the convolutional graph neural network 502. For example, the entity-level relation matrix 506 includes a representation of relationships between entities in the initial dependency graph structure 404. For instance, the entity-level relation matrix 506 includes information related to the structural, semantic, and syntactic components of the initial dependency graph structure 404 (e.g., as opposed to the adjacency matrix which represents whether there is an edge or connection between two entities). Accordingly, rather than just a connection or a weight of a connection between two entities, the entity-level relation matrix 506 further includes types of relations and values such as "is-a," "part-of", or "works-for."

To illustrate, the temporal dependency understanding system 102 utilizes the convolutional graph neural network 502 to take the dynamically learned graph structure G* and utilize a graph embedding layer to convert input node features F' into low-dimensional representations that are then passed through a graph U-net encoder-decoder ($\mho$) to acquire the entity-level relation matrix 506. Further, the temporal dependency understanding system 102 represents acquiring the entity-level relation matrix 506 as $Y=\mho(F')$, $Y \in R^{|*|*D'}$.

As further shown in FIG. 5, the temporal dependency understanding system 102 utilizes a function 510 to generate a temporal dependency graph 512 from an adjacency matrix 406 (A*) and the entity-level relation matrix 506. For instance, the temporal dependency understanding system 102 utilizes a bilinear function 510 to map and link relation probabilities $Z_l$ and $Z_r$ between the entity-level relation matrix 506 and the adjacency matrix 406. To illustrate, the temporal dependency understanding system 102 represents the mapping and linking as $Z_l=\sigma(YW_1Y+b_1)$ and $Z_r=\sigma(A^*W_rA^*+b_r)$, where $W_l$, $W_r$, $b_l$, $b_r \in R^{D'*D'}$ represents learnable parameters. Further in some embodiments, this is followed by a Softmax layer for link prediction and relations classification.

As further shown in FIG. 5, in one or more embodiments, the temporal dependency understanding system 102 further generates a path reconstruction loss 511, which was discussed above in relation to FIG. 2. In some embodiments, a majority of node pairs do not have any ground truth link or temporal relation. Previously, conventional systems would model relations between all entity pairs regardless of whether the entity pair has any relationships, which resulted in the dispersion of attention due to learning (most) non-existent edge connections. As mentioned above, in one or more embodiments, the temporal dependency understanding system 102 utilizes the path reconstruction loss 511 ($L_{path}$) to force a model to pay more attention to learn entity pairs with relationships rather than ones without relationships.

To illustrate, the temporal dependency understanding system 102 utilizes the following loss equations:

$$L_{ce} = -\frac{1}{\sum^{i=0}_{l} N_i} \sum_{i=1}^{l} \sum_{j=1}^{N_i} \{r_j^i \log P(r_j^i) + (1 - r_j^i) \log(1 - P(r_j^i))\} \tag{1}$$

$$L_{path} = -\frac{1}{\sum_{i=0}^{l} N_i} \sum_{i=1}^{l} \sum_{j=1}^{N_i} \{r_j^i \log N(\phi_i) + (1 - r_j^i) \log(1 - N(\phi_i))\} \tag{2}$$

For instance, the first loss equation indicates a cross entropy loss over all direct edge connections between all pairs of entities, where $$r_j^i$$

indicates the relation between the entity pair and $$P(r_j^i)$$

indicates a probability of relation label r. Moreover, the second loss equation shows the path reconstruction loss 511 modifying the cross-entropy loss. In particular, the second loss equation modifies the cross-entropy loss by sampling all $n^2$ entity pairs and maximizing the probability of the shortest dependency path $\mathcal{N}(\phi)$ between the entity pair nodes.

Furthermore, the path reconstruction loss 511 and the existing classification loss are added as the training objective given by $L=L_{path}+L_{ce}$. Thus, in some embodiments, the temporal dependency understanding system 102 utilizes the path reconstruction loss 511 to modify parameters of the convolutional graph neural network 502 to improve the generation of temporal dependency graphs.

In one or more embodiments, as part of determining the path reconstruction loss 511, dependency link prediction and entity-level relation classification are correlated tasks and reinforce each other. In some embodiments the temporal dependency understanding system 102 uses multi-task training to optimize both tasks simultaneously using the path prediction cross entropy loss. Further, in some embodiments the final optimization uses a weighted sum of the dependency link prediction loss and entity-level relation classification loss $L=\Delta_{LI}+(1-\lambda)L_r$, where the weighting factor $\lambda$ is a hyperparameter.

In one or more embodiments, the temporal dependency understanding system 102 trains the document understanding pipeline (parser) by tuning various hyper-parameters. For instance, the temporal dependency understanding system 102 specifies the number of hidden layers for WR-GCN, BERT-GCN, and HyperGraphGCN as {1, 2, 3}. Further, in some embodiments the temporal dependency understanding system 102 specifies the size of hidden layers for WR-GCN, BERT-GCN, and HyperGraphGCN as {64, 128, 256, 512}.

Furthermore, in some embodiments the temporal dependency understanding system 102 specifies the BERT embedding size as (768), the dropout as $\delta\in\{0.2, 0.3, 0.4, 0.5, 0.6\}$, and the learning rate as $\lambda\in\{1e\text{-}5, 1e\text{-}4, 1e\text{-}3, 1e\text{-}2, 1e\text{-}1\}$. Moreover, in some embodiments, the temporal dependency understanding system 102 specifies the weight decay as $\omega\in\{1e\text{-}6, 1e\text{-}5, 1e\text{-}4, 1e\text{-}3\}$, the batch size as $b\in\{16, 32, 64\}$, epochs as ($\leq 100$), and $\epsilon$-sparsity as $\in[0, 1]$.

In one or more embodiments for the iterative deep graph learning model discussed above, the temporal dependency understanding system 102 specifies IDGL smoothness ratio as 0.5, IDGL sparsity ratio as 0.5, and IDGL connectivity ratio as 0.5. Furthermore, for the convolutional graph neural network 502, the temporal dependency understanding system 102 specifies the size of hidden layers in Graph U-net as {64, 128, 256, 512}.

As mentioned above, the temporal dependency understanding system 102 further utilizes a temporal dependency graph in downstream document understanding tasks. For example, FIG. 6 illustrates the temporal dependency understanding system 102 utilizing a temporally-informed self-attention layer in accordance with one or more embodiments.

Figure 6:
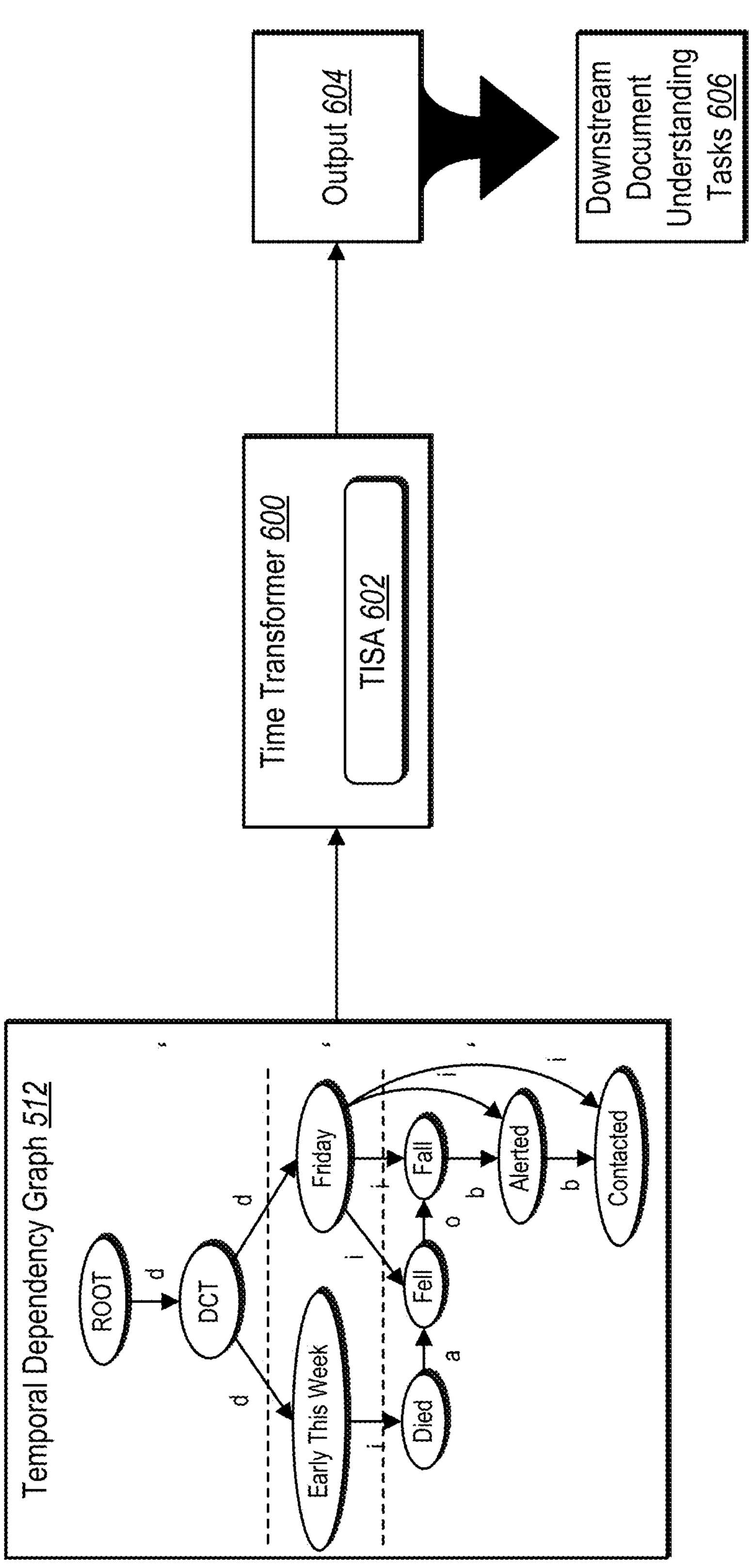
FIG. 6 illustrates an overview diagram of the temporal dependency understanding system generating an output prediction for utilization in downstream document understanding tasks in accordance with one or more embodiments.

As shown, FIG. 6 illustrates an overview diagram of the temporal dependency understanding system 102 utilizing a time transformer 600 to perform downstream document understanding tasks 606. Specifically, the temporal dependency understanding system 102 injects the temporal dependency graph 512 into the attention mechanism of a pre-trained transformer neural network to generate the time transformer 600. In some embodiments, the temporal dependency understanding system 102 utilizes a temporal dependency graph 512 generated as described above in relation to FIGS. 2-5. In alternative embodiments, the temporal dependency understanding system 102 utilizes a temporal dependency graph generated in a manner of that than described in relation to FIGS. 2-5.

As shown in FIG. 6, the time transformer 600 includes a temporally-informed self-attention layer 602. A temporally-informed self-attention layer 602 is an attention mechanism of a transformer neural network into in which a temporal dependency graph 512 has been integrated. Specifically, the time transformer 600 augments the flow of information in a transformer network via the temporally informed self-attention mechanism 602.

The temporal dependency understanding system 102 utilizes the time transformer 600 and its temporally-informed self-attention layer 602 to generate an output 604 for use in the downstream document understanding tasks 606. For instance, to perform the downstream document understanding tasks 606, the temporal dependency understanding system 102 utilizes the output 604 of the time transformer 600 with one or more fully connected layers or other neural network layers to generate prediction for a document understanding task.

Figure 7A:
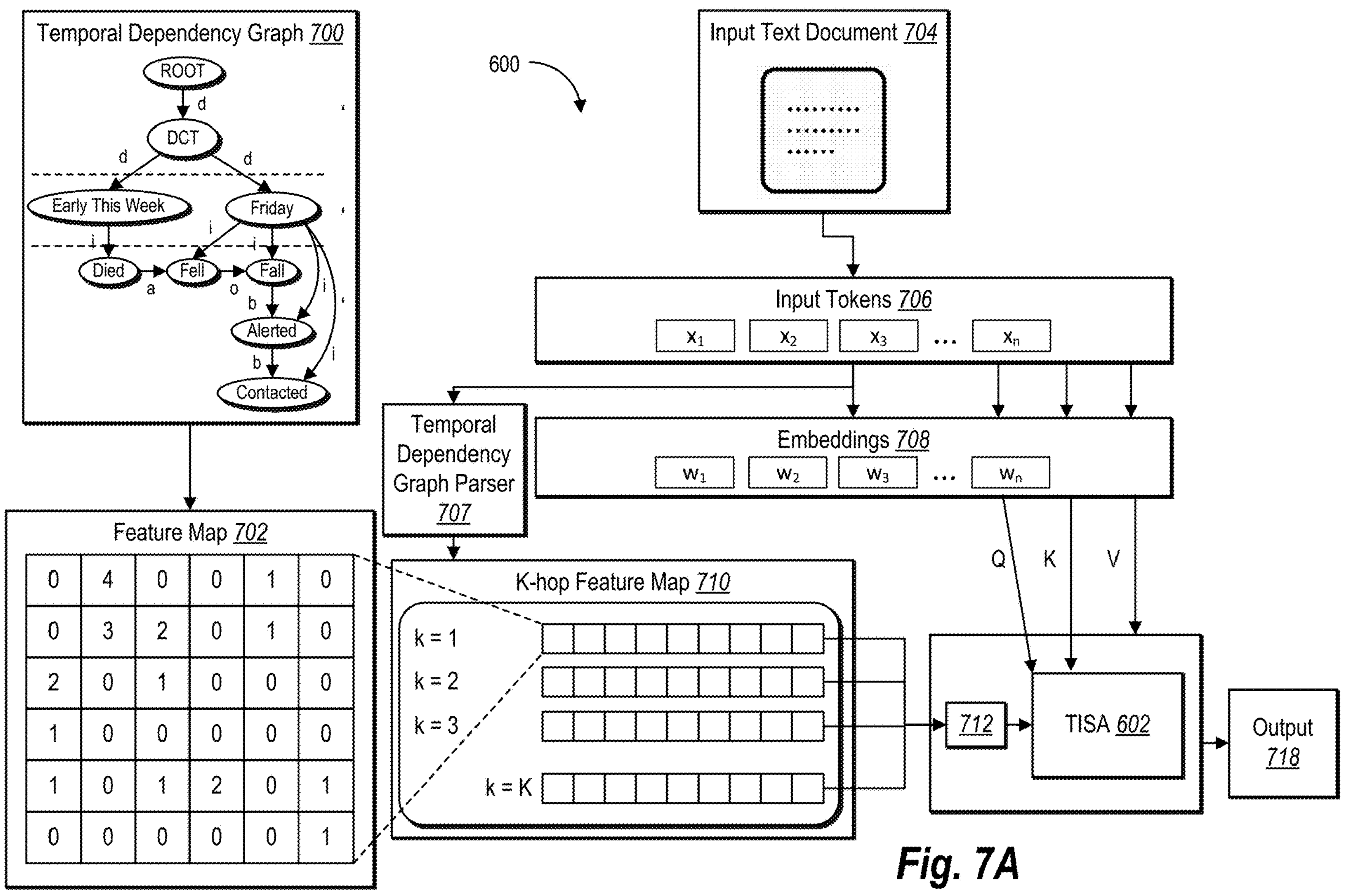
FIGS. 7A-7B illustrates an example diagram of the temporal dependency understanding system incorporating a temporal dependency graph into self-attention layer of a transformer in accordance with one or more embodiments.

FIG. 7A illustrates additional details of the architecture of the time transformer 600. Specifically, FIG. 7A shows the temporal dependency understanding system 102 generating a feature map 702 from a temporal dependency graph 700. For instance, the temporal dependency understanding system 102 transforms the temporal dependency graph 700 into a set of features that represents the temporal dependency graph 700. In particular, the temporal dependency understanding system 102 generates the feature map 702 that includes levels of separation between nodes of the temporal dependency graph 700 and attention masks (e.g., from a text document 704) that indicate relationships between nodes of the temporal dependency graph 700.

As shown in FIG. 7A, the feature map 702 includes a K-hop feature map 710. For instance, the K-hop feature map 710 includes utilizing K self-attention layers that encode the temporal relationship if traversing K hops in the temporal dependency graph 700. To illustrate, if starting from node A, the minimum number of hops (k) required to reach another node B is regarded as a k-hop distance between A and B written as k-hop(A,B). Furthermore, the temporal dependency understanding system 102 generates K masks to represent the (k)-hop distance between two nodes to aggregate information across longer ranges in the temporal dependency graph 700.

As mentioned above, the temporal dependency understanding system 102 generates attention masks. For example, the attention masks include relationships between nodes of the temporal dependency graph 700. Furthermore, in some embodiments the attention masks indicate a weight of the relationships. Moreover, in some embodiments, the temporal dependency understanding system 102 determines the attention masks from the text document 704. In some embodiments, the attention masks include a query variable (Q, e.g., how much attention to pay to a token), a key variable (K, e.g., a token's content), and a value variable (V, e.g., semantic or contextual information regarding a token).

To illustrate, the attention masks $M \in \{0, 1, 2, \ldots, r\}^{n \times n}$ denotes if there is a relationships between entity i and j and n is the number of tokens in the input text. Further, the value of the mask utilizes Allen's interval algebra and is set to 0 if there is no relationship or set to "Overlap" if there is a conflict. As further shown in FIG. 7A, the temporal dependency understanding system 102 generates input tokens 706 from a text document 704 (e.g., corresponding with the temporal dependency graph 700) and further generates embeddings 708 from the input tokens (e.g., generates embeddings similar to what was described above in FIG. 3). Moreover, FIG. 7A shows an arrow from the input tokens 706 through a temporal dependency graph parser 707 (e.g., the novel document understanding pipeline discussed above in FIGS. 2-5) to the K-hop feature map 710.

In some embodiments, the arrow indicates the temporal dependency understanding system 102 feeding the document understanding information obtained from parsing the text document 704 according to the novel document understanding pipeline discussed above. Further, in some embodiments, the temporal dependency understanding system 102 also passes document timestamp information or time associated with the text document 704 into the K-hop feature map 710.

As shown, FIG. 7A further illustrates utilizing a time transformer with a temporally informed self-attention layer 716 that incorporates syntax and/or co-reference graphs into a transformer architecture to improve downstream tasks. In some embodiments, the temporal dependency understanding system 102 utilizes the temporally informed self-attention layer 716 of the time transformer 600 to encode additional knowledge from graphs as a masked self-attention layer into the time transformer 600. As also shown, the attention masks (e.g., Q, K, and V discussed above as query variable, a key variable, and a value variable) pass through the temporally informed self-attention layer 716. Accordingly, the time transformer takes as input a combination of the input tokens 706, the positional information (e.g., from the K-hop feature map 710), and the attention masks via the temporally informed self-attention layer 716.

Additionally, as shown in FIG. 7A, the temporal dependency understanding system 102 further utilizes a hyperbolic feed-forward layer 712 to learn the mask weights from the feature map 702. Moreover, the hyperbolic feed-forward layer 712 further avoids distortion of the feature space in graph representations. Moreover, in one or more embodiments, the temporal dependency understanding system 102 utilizes a soft-mask learning strategy to enable the self-attention layer to re-weight the importance of each mask and avoid the problem of a vanishing gradient.

Figure 7B:
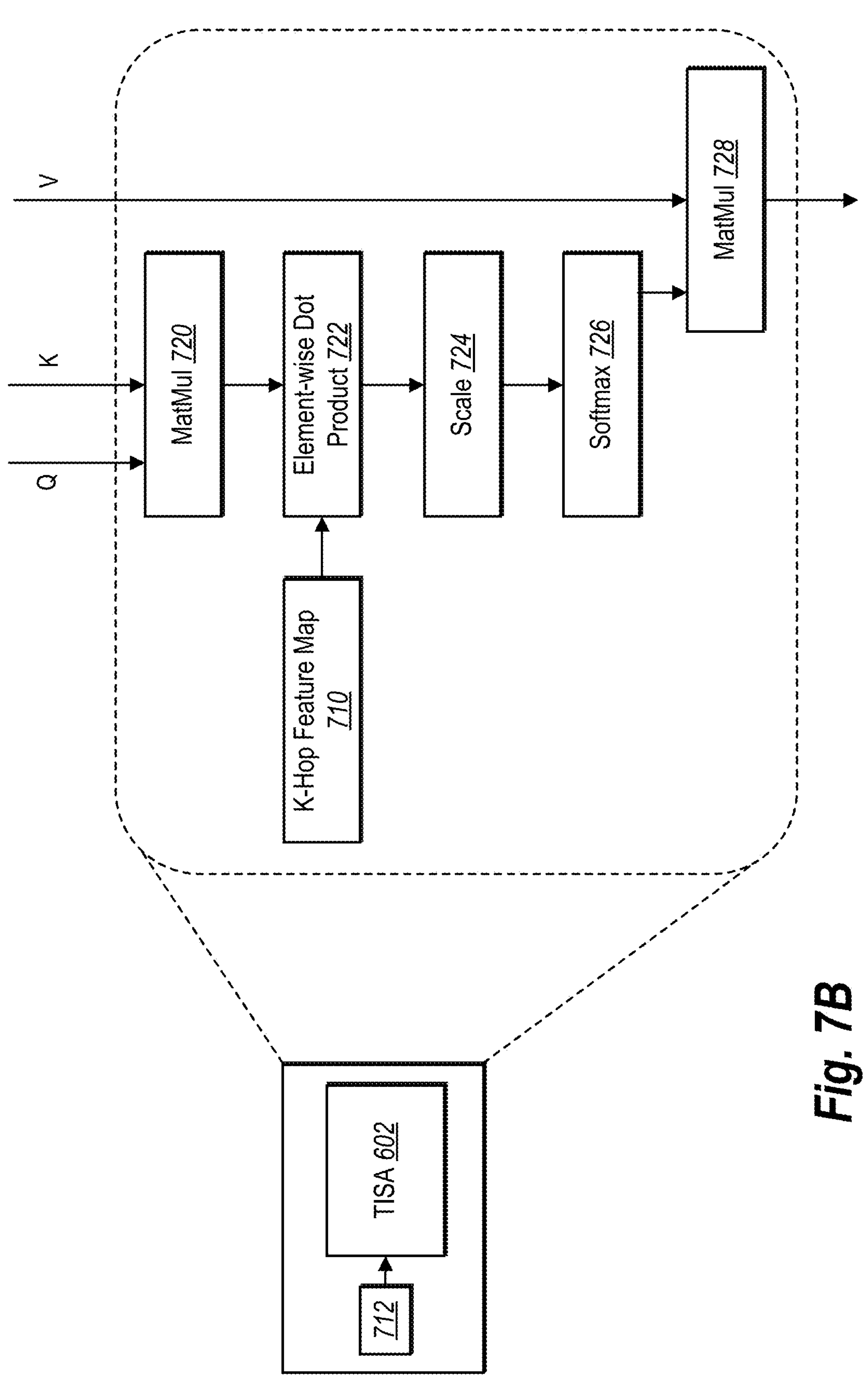

FIG. 7B illustrates additional details regarding the temporally informed self-attention layer 716. For example, FIG. 7B shows MatMul 720 which indicates matrix multiplication for Q and K (e.g., the query variable and the key variable). For instance, the matrix multiplication includes an operation to compute a weighted sum of the query and key variable. Further, the matrix multiplication allows for the temporal dependency understanding system 102 to process and transform the query and key variable.

As further shown, FIG. 7B illustrates the temporal dependency understanding system 102 feeding the K-hop feature map 710 and the matrix multiplication (e.g., MatMul 720) into an element-wise dot product 722. In one or more embodiments, the element-wise dot product 722 includes an operation to combine two matrices by multiplying corresponding elements. For instance, the temporal dependency understanding system 102 multiplies the elements of the K-hop feature map 710 with corresponding elements resulting from the matrix multiplication (MatMul 720). Further, the element-wise dot product 722 generates a vector or an array with the same dimensions present with the K-hop feature map 710 and the query and key variable.

As also shown in FIG. 7B, the temporal dependency understanding system 102 further performs an act 724 of scaling the product of the element-wise dot product 722. In one or more embodiments, the act of scaling includes utilizing a constant value and multiplying each element of the vector or array from the element-wise dot product 722.

Moreover, FIG. 7B shows the temporal dependency understanding system 102 performing a SoftMax 726 which includes applying a function to transform a vector or an array into a probability distribution. For instance, the SoftMax 726 includes assigning a probability value to each element in the vector that results from the element-wise dot product 722. As further shown in FIG. 7B, the temporal dependency understanding system 102 also performs an additional MatMul 728 (e.g., matrix multiplication) between the result of the SoftMax 726 (e.g., the probability value distribution of the element-wise dot product 722) and V (e.g., the value variable).

As shown, the temporal dependency understanding system 102 utilizing the time transformer generates an output 718. The temporal dependency understanding system 102 further utilizes the output 718 for further downstream document understanding tasks such as timeline creation, time-aware summarization, temporal question-answering, temporal information extraction, contractual document understanding, social media application (e.g., hate speech detection), analyzing temporality in suicidal ideation detection, abuse detection, financial tasks, and temporal common sense reasoning.

In one or more embodiments, the temporal dependency understanding system 102 assumes the number of tokens in each sentence to be n and extracts k-hop mask matrices from the text document as $O(n)^2$ in the online inference phase. In some embodiments the time complexity of the Transformer embedding lookup layer is O(n). Further, in some embodiments the temporally-informed self-attention layer calculates the attention score in $O(KD_q n^2)$ for both $QK^T$ and learns the mask weights using a hyperbolic feedforward layer ($MW^M$), where $D_q$ is dimension of Q and K is the number of sub-networks. Moreover, in some embodiments the time complexity of the Time-BERT remains the same for a small enough value of k($k \leq 15$ in experiments).

FIG. 8 illustrates results of the temporal dependency understanding system 102 compared with baseline models and further shows results of ablative components in accordance with one or more embodiments. For example, FIG. 8 shows a comparison between the performance of DocTime (e.g., the temporal dependency understanding system 102) against other baseline methods on TD-Trees (temporal dependency), TD-Graphs, and ContractTDG. For instance, the results shown in FIG. 8 demonstrate that DocTime (e.g, the temporal dependency understanding system 102) outperforms both Neural and BERT Ranking Parser by a significant margin on the TDT (2-4%), TDG (5-6%), and ContractTDG (3-4%) datasets.

Furthermore, for ContractTDG, FIG. 8 shows that the temporal dependency understanding system 102 successfully handles document-level long-range dependencies in a challenging ContractTDG dataset from the 6-12% relative improvement over the BERT based ranking parser.

Moreover, FIG. 8 further shows ablative components. For example, to assess the contribution of the structure, syntactic, and semantic graph features, the ablation study analyzes the effect of different types of training loss. For instance, removing the semantic graph consistently degrades performance, removing the structure graph reduces the performance below the BERT Ranking Parser, and as further indicated, the syntactic graph adds incremental value to the temporal dependency understanding system 102 due to its relational learning of syntactic dependencies within each sentence.

Furthermore, FIG. 8 shows that with the path prediction loss (e.g., the path reconstruction loss discussed above), the temporal dependency understanding system 102 demonstrates the best performance (e.g., as compared to the graph prediction and the pairwise link prediction).

FIG. 9 illustrates results of F1 scores and exact match performance for tasks on easy and hard sections for a specific dataset in accordance with one or more embodiments. For example, an F1 score includes a machine learning evaluation metric that measures a model's accuracy. Further, FIG. 9 shows results of F1 scores and exact match performance for QA task on easy and hard sections of a TimeQA dataset. As shown in FIG. 9, for the BigBird and FiD dataset, the Time-BigBird and Time-FiD indicates the temporal dependency understanding system 102 utilizing a time transformer model (as discussed above). As shown in FIG. 9, by utilizing the proposed time transformer model, the temporal dependency understanding system 102 shows superior performance compared to variants (e.g., without the time transformer model discussed above) of the temporal dependency understanding system 102.

Figure 10:
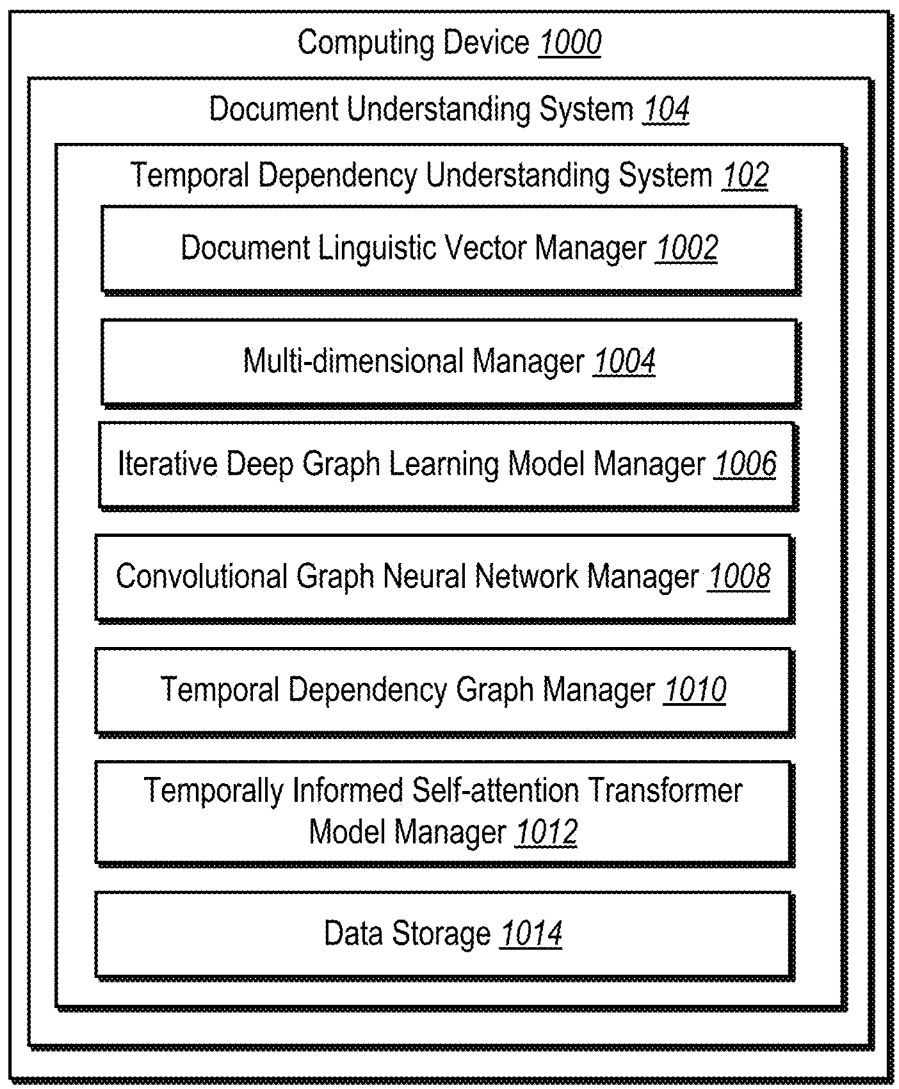
FIG. 10 illustrates an example schematic diagram of the temporal dependency understanding system in accordance with one or more embodiments.

Turning to FIG. 10, additional detail will now be provided regarding various components and capabilities of the temporal dependency understanding system 102. In particular, FIG. 10 illustrates an example schematic diagram of a computing device 1000 (e.g., the server(s) 106 and/or the client device(s) 110*a*-110*n*) implementing the temporal dependency understanding system 102 in accordance with one or more embodiments of the present disclosure for components 1000-1014. As illustrated in FIG. 10, the temporal dependency understanding system 102 includes a document linguistic vector manager 1002, a multi-dimensional manager 1004, an iterative deep graph learning model manager 1006, a convolutional graph neural network manager 1008, a temporal dependency graph manager 1010, and a temporally-informed self-attention transformer model manager 1012.

The document linguistic vector manager 1002 accesses one or more text digital documents. For example, the document linguistic vector manager 1002 accesses the digital document(s) and generates structural graphs, syntactic graphs, and semantic graphs utilizing the encoder 302 and the structural graph 304, the syntactic graph 306, and the semantic graph 308. In particular, the document linguistic vector manager 1002 generates various graphs and further generates a structural vector 310, a syntactic vector 312, and a semantic vector 314. Moreover, the document linguistic vector manager 1002 interacts with other components to pass the generated vectors for further processing.

The multi-dimensional manager 1004 generates a multi-dimensional vector 318. For example, the multi-dimensional manager 1004 receives the structural vector 310, the syntactic vector 312, and the semantic vector 314 from the document linguistic vector manager 1002 and generates the multi-dimensional vector 318. In particular, the multi-dimensional manager 1004 generates the multi-dimensional vector by combining each of the received vectors or by concatenating each of the received vectors. Furthermore, the multi-dimensional manager 1004 passes the multi-dimensional vector 318 to other components in the document understanding pipeline for further processing.

The iterative deep graph learning model manager 1006 receives the multi-dimensional vector 318 from the multi-dimensional manager 1004. For example, the iterative deep graph learning model manager 1006 generates an initial dependency graph structure 404 by utilizing an iterative deep graph learning model 402. Moreover, the iterative deep graph learning model manager 1006 also utilizes the iterative deep graph learning model 402 to further generate an adjacency matrix 406 that corresponds with the initial dependency graph structure 404.

The convolutional graph neural network manager 1008 receives the initial dependency graph structure 404 and the adjacency matrix 406 from the iterative deep graph learning model manager 1006. For example, the convolutional graph neural network manager 1008 generates an entity-level relation matrix 506 by utilizing a convolutional graph neural network 208. Furthermore, the convolutional graph neural network manager 1008 generates the entity-level relation matrix 506 from the initial dependency graph structure 404.

The temporal dependency graph manager 1010 generates a temporal dependency graph 512. For example, the temporal dependency graph manager 1010 receives the entity-level relation matrix 506 and the adjacency matrix 406 from the convolutional graph neural network manager 1008. Further, the temporal dependency graph manager 1010 generates the temporal dependency graph 512 from the entity-level relation matrix 506 and the adjacency matrix 406.

The temporally-informed self-attention transformer model manager 1012 generates an prediction. For example, the temporally-informed self-attention transformer model manager 1012 receives a temporal dependency graph from the temporal dependency graph manager 1010 and further generates a feature map. Moreover, the temporally-informed self-attention transformer model manager 1012 further generates attention masks from a text document corresponding to the temporal dependency graph. Additionally, the temporally-informed self-attention transformer model manager 1012 generates a combined embedding that includes tokens from the text document, the feature map, and the attention masks. Furthermore, the temporally-informed self-attention transformer model manager 1012 utilizes a temporally-informed self-attention layer of a time transformer to generate the output.

The data storage 1014 stores datasets, documents, graphs (initial dependency graph structures, temporal dependency graphs), matrices (adjacency matrices and entity-level relation matrices), and pre-trained models. For example, the data storage 1014 stores digital text documents accessed from various dataset and stores corresponding temporal dependency graphs. Further, the data storage 1014 stores determined event relations from the graphs and matrices.

Each of the components 1002-1014 of the temporal dependency understanding system 102 can include software, hardware, or both. For example, the components 1002-1014 can include one or more instructions stored on a computer-readable storage medium and executable by processors of one or more computing devices, such as a client device or server device. When executed by the one or more processors, the computer-executable instructions of the temporal dependency understanding system 102 can cause the computing device(s) to perform the methods described herein. Alternatively, the components 1002-1014 can include hardware, such as a special-purpose processing device to perform a certain function or group of functions. Alternatively, the components 1002-1014 of the temporal dependency understanding system 102 can include a combination of computer-executable instructions and hardware.

Furthermore, the components 1002-1014 of the temporal dependency understanding system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1002-1014 of the temporal dependency understanding system 102 may be implemented as a stand-alone application, such as a desktop or mobile application. Furthermore, the components 1002-1014 of the temporal dependency understanding system 102 may be implemented as one or more web-based applications hosted on a remote server. Alternatively, or additionally, the components 1002-1014 of the temporal dependency understanding system 102 may be implemented in a suite of mobile device applications or "apps." For example, in one or more embodiments, the temporal dependency understanding system 102 can comprise or operate in connection with digital software applications such as ADOBE® ACROBAT, ADOBE® ACROBAT PRO, ADOBE® DOCUMENT CLOUD, and/or ADOBE® EXPERIENCE CLOUD. The foregoing are either registered trademarks or trademarks of Adobe Inc. in the United States and/or other countries.

FIGS. 1-10, the corresponding text, and the examples provide a number of different methods, systems, devices, and non-transitory computer-readable media of the temporal dependency understanding system 102. In addition to the foregoing, one or more embodiments can also be described in terms of flowcharts comprising acts for accomplishing the particular result, as shown in FIG. 11. FIG. 11 may be performed with more or fewer acts. Further, the acts may be performed in different orders. Additionally, the acts described herein may be repeated or performed in parallel with one another or in parallel with different instances of the same or similar acts.

FIG. 11 illustrates a flowchart of a series of acts 1100 for generating a temporal dependency graph in accordance with one or more embodiments. FIG. 11 illustrates acts according to one embodiment, alternative embodiments may omit, add to, reorder, and/or modify any of the acts shown in FIG. 11. In some implementations, the acts of FIG. 11 are performed as part of a method. For example, in some embodiments, the acts of FIG. 11 are performed as part of a computer-implemented method. Alternatively, a non-transitory computer-readable medium can store instructions thereon that, when executed by at least one processor, cause a computing device to perform the acts of FIG. 11. In some embodiments, a system performs the acts of FIG. 11. For example, in one or more embodiments, a system includes at least one memory device. The system further includes at least one server device configured to cause the system to perform the acts of FIG. 11.

The series of acts 1100 includes an act 1102 of generating a structural vector, a syntactic vector, and a semantic vector. Moreover, the series of acts 1100 includes an act 1106 of generating an initial dependency graph structure from the structural vector, the syntactic vector, and the semantic vector. Further, the series of acts 1100 includes an act 1108 of generating an entity-level relation matrix from the initial dependency graph structure. Moreover, the series of acts 1100 includes an act 1110 of generating a temporal dependency graph containing structure and relationships of the text document.

In particular, the act 1102 can include generating, from a text document, a structural vector, a syntactic vector, and a semantic vector. Further, the act 1102 includes, in one or more implementations, utilizing a structural graph network to generate the structural vector, a syntactic graph network to generate the syntactic vector, and a semantic graph network to generate the semantic vector. In one or more implementations, the series of acts 1100 further includes generating a multi-dimensional vector by combining the structural vector, the syntactic vector, and the semantic vector.

Moreover, the act 1106 includes generating an initial dependency graph structure from the structural vector, the syntactic vector, and the semantic vector. For example, in one or more implementations, act 1106 comprises generating, utilizing an iterative deep graph learning model, an initial dependency graph structure and an adjacency matrix from a multi-dimensional vector.

Furthermore, the act 1108 includes generating, utilizing a convolutional graph neural network, an entity-level relation matrix from the initial dependency graph structure. Moreover, the sub 1110 includes generating, from the entity-level relation matrix and the adjacency matrix, a temporal dependency graph containing structure and relationships of the text document.

For example, in one or more embodiments, the series of acts 1100 includes learning parameters to modify the convolutional graph neural network by determining a path reconstruction loss from the entity-level relation matrix and the adjacency matrix. In addition, in one or more embodiments, the series of acts 1100 includes maximizing a shortest dependency path between entity pairs as indicated by the entity-level relation matrix. Further, in one or more embodiments, the series of acts 1100 includes generating, from the temporal dependency graph, a feature map comprising levels of separations between nodes of the temporal dependency graph and attention masks that indicate relationships between nodes of the temporal dependency graph.

Moreover, in one or more embodiments, the series of acts 1100 includes generating a combined embedding utilizing tokens from the text document, the levels of separation between nodes of the temporal dependency graph, and the attention masks. Additionally, in one or more embodiments, the series of acts 1100 includes generating, utilizing a temporally-informed self-attention layer of a time transformer, an output prediction by utilizing the combined embedding.

Furthermore, in one or more embodiments, the series of acts 1100 includes generating the structural vector, the syntactic vector, and the semantic vector further comprises extracting, utilizing an encoder, token level features from the text document. Additionally, in one or more embodiments, the series of acts 1100 includes.

Moreover, in one or more embodiments, the series of acts 1100 includes generating the multi-dimensional vector for a first entity node of the text document. Further, in one or more embodiments, the series of acts 1100 includes generating an additional multi-dimensional vector for a second entity node of the text document.

In addition, in one or more embodiments, the series of acts 1100 includes iteratively updating a graph structure generated from the multi-dimensional vector to generate the initial dependency graph structure. Moreover, in one or more embodiments, the series of acts 1100 includes generating the entity-level relation matrix by utilizing upsampling and downsampling layers with skip connections between the upsampling and downsampling layers. Further, in one or more embodiments, the series of acts 1100 includes utilizing a function to link relational probabilities between the entity-level relation matrix and the adjacency matrix.

Further, in one or more embodiments, the series of acts 1100 includes generating, from a text document, a structural vector, a syntactic vector, and a semantic vector by extracting token level features from the text document. Moreover, in one or more embodiments, the series of acts 1100 includes generating a multi-dimensional vector for an entity node of the text document by combining the structural vector, the syntactic vector, and the semantic vector. Further, in one or more embodiments, the series of acts 1100 includes generating, utilizing an iterative deep graph learning model, an initial dependency graph structure corresponding with an adjacency matrix from the multi-dimensional vector. Additionally, in one or more embodiments, the series of acts 1100 includes generating, utilizing a convolutional graph neural network, an entity-level relation matrix from the initial dependency graph structure. Further, in one or more embodiments, the series of acts 1100 includes generating, from the entity-level relation matrix and the adjacency matrix, a temporal dependency graph by linking relational probabilities between the entity-level relation matrix and the adjacency matrix.

Furthermore, in one or more embodiments, the series of acts 1100 includes training the convolutional graph neural network by determining a path reconstruction loss from the entity-level relation matrix and the adjacency matrix. Moreover, in one or more embodiments, the series of acts 1100 includes focusing on entity pairs with relationships by maximizing a shortest dependency path between entity pairs as indicated by the entity-level relation matrix.

Further, in one or more embodiments, the series of acts 1100 includes generating, from the temporal dependency graph, a feature map comprising levels of separations between nodes of the temporal dependency graph and attention masks that indicate relationships between nodes of the temporal dependency graph. Moreover, in one or more embodiments, the series of acts 1100 includes generating a combined embedding utilizing tokens from the text document, the levels of separation between nodes of the temporal dependency graph, and the attention masks. Additionally, in one or more embodiments, the series of acts 1100 includes generating, utilizing a temporally-informed self-attention layer of a time transformer, an output prediction by utilizing the combined embedding.

FIG. 12 illustrates a flowchart of a series of acts 1200 for utilizing a temporally-informed self-attention layer of a time transformer in accordance with one or more embodiments. FIG. 12 illustrates acts according to one embodiment, alternative embodiments may omit, add to, reorder, and/or modify any of the acts shown in FIG. 12. In some implementations, the acts of FIG. 12 are performed as part of a method. For example, in some embodiments, the acts of FIG. 12 are performed as part of a computer-implemented method. Alternatively, a non-transitory computer-readable medium can store instructions thereon that, when executed by at least one processor, cause a computing device to perform the acts of FIG. 12. In some embodiments, a system performs the acts of FIG. 12. For example, in one or more embodiments, a system includes at least one memory device. The system further includes at least one server device configured to cause the system to perform the acts of FIG. 12.

The series of acts 1200 includes an act 1202 of generating a temporal dependency graph. Moreover, the series of acts 1200 includes an act 1206 of generating a time transformer by injecting the temporal dependency graph into an attention mechanism of a pre-trained transformer. Further, the series of acts 1200 includes an act 1208 of generating an output by utilizing the time transformer.

In particular, the act 1202 can include generating, from a text document, a temporal dependency graph. For example, act 1202 includes, in one or more implementations, generating a structural vector, a syntactic vector, and a semantic vector. Further, the act 1202 includes generating a multi-dimensional vector from the structural vector, the syntactic vector, and the semantic vector. Moreover, the act 1202 includes generating an initial dependency graph structure from the multi-dimensional vector. Further, the act 1202 includes generating an entity-level relation matrix from the initial dependency graph structure. Moreover, the act 1202 generating a temporal dependency graph containing structure and relationships of the text document.

Further, the act 1206 includes generating a time transformer by injecting the temporal dependency graph into an attention mechanism of a pre-trained transformer. For example, act 1206 includes generating, from the temporal dependency graph, a feature map comprising levels of separations between nodes of the temporal dependency graph and attention masks that indicate relationships between nodes of the temporal dependency graph. Moreover, the act 1206 includes generating a combined embedding utilizing tokens from the text document, the levels of separation between nodes, and the attention masks. Furthermore, the act 1208 includes generating, utilizing a temporally-informed self-attention layer of a time transformer, an output by utilizing the combined embedding.

Further, in one or more embodiments, the series of acts 1200 includes receiving, from a user of a client device a temporal search query pertaining to the text document. Moreover, in one or more embodiments, the series of acts 1200 includes generating, utilizing the output, a response to the temporal search query. Additionally, in one or more embodiments, the series of acts 1200 includes generating the temporal dependency graph from an entity-level relation matrix of the text document and an adjacency matrix of the text document.

Further, in one or more embodiments, the series of acts 1200 includes generating a number of attention masks corresponding to a number of the levels of separations between nodes of the temporal dependency graph. Moreover, in one or more embodiments, the series of acts 1200 includes utilizing a hyperbolic feed-forward layer to learn weights for the attention masks, the weights indicating a degree of attention for the time transformer to process.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction and scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 13:
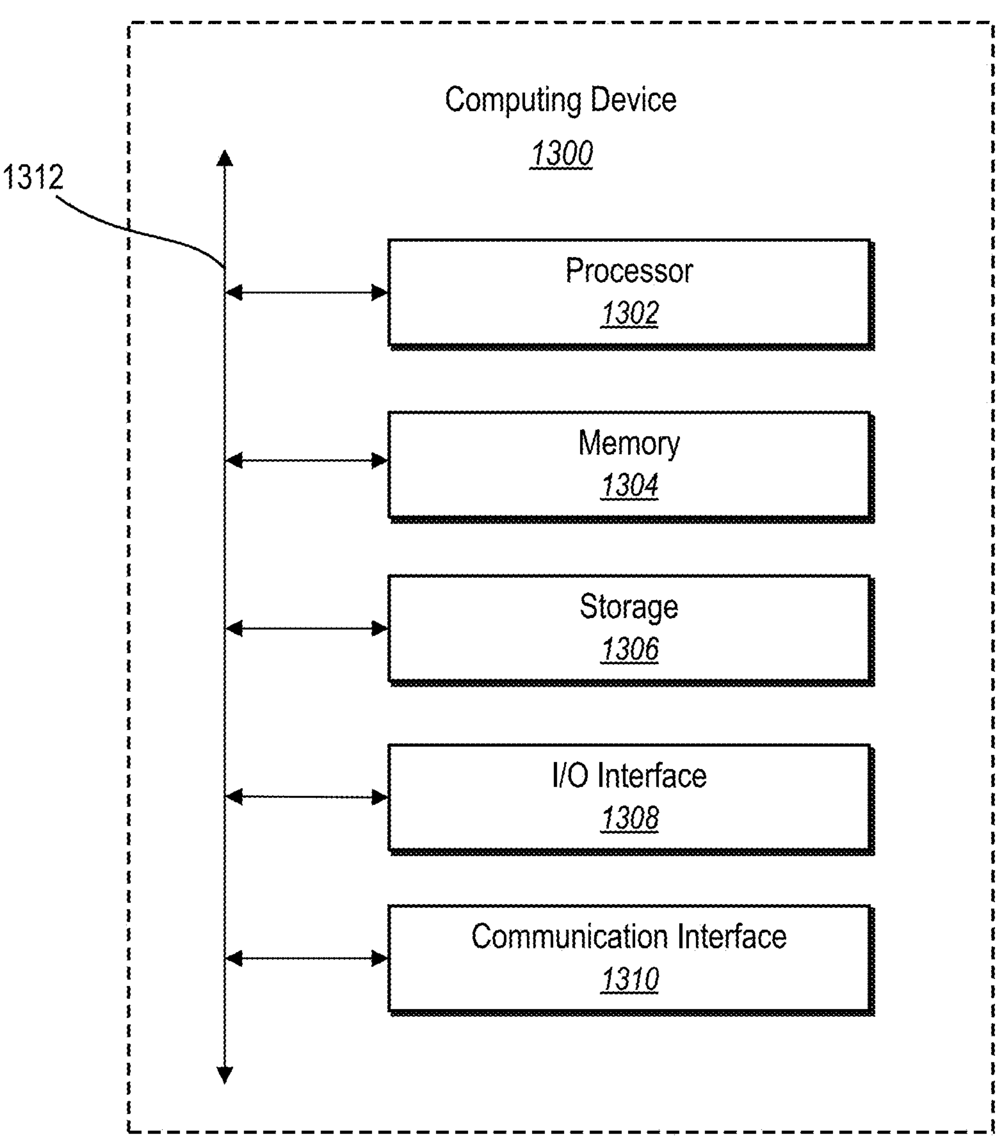
FIG. 13 illustrates a block diagram of an example computing device in accordance with one or more embodiments.

FIG. 13 illustrates a block diagram of an example computing device 1300 that may be configured to perform one or more of the processes described above. One will appreciate that one or more computing devices, such as the computing device 1300 may represent the computing devices described above (e.g., server(s) 106, client devices 110*a*-110*n*, and computing device 1300). In one or more embodiments, the computing device 1300 may be a mobile device (e.g., a mobile telephone, a smartphone, a PDA, a tablet, a laptop, a camera, a tracker, a watch, a wearable device, etc.). In some embodiments, the computing device 1300 may be a non-mobile device (e.g., a desktop computer or another type of client device). Further, the computing device 1300 may be a server device that includes cloud-based processing and storage capabilities.

As shown in FIG. 13, the computing device 1300 can include one or more processor(s) 1302, memory 1304, a storage device 1306, input/output interfaces 1308 (or "I/O interfaces 1308"), and a communication interface 1310, which may be communicatively coupled by way of a communication infrastructure (e.g., bus 1312). While the computing device 1300 is shown in FIG. 13, the components illustrated in FIG. 13 are not intended to be limiting. Additional or alternative components may be used in other embodiments. Furthermore, in certain embodiments, the computing device 1300 includes fewer components than those shown in FIG. 13. Components of the computing device 1300 shown in FIG. 13 will now be described in additional detail.

In particular embodiments, the processor(s) 1302 includes hardware for executing instructions, such as those making up a computer program. As an example, and not by way of limitation, to execute instructions, the processor(s) 1302 may retrieve (or fetch) the instructions from an internal register, an internal cache, memory 1304, or a storage device 1306 and decode and execute them.

The computing device 1300 includes memory 1304, which is coupled to the processor(s) 1302. The memory 1304 may be used for storing data, metadata, and programs for execution by the processor(s). The memory 1304 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1304 may be internal or distributed memory.

The computing device 1300 includes a storage device 1306 includes storage for storing data or instructions. As an example, and not by way of limitation, the storage device 1306 can include a non-transitory storage medium described above. The storage device 1306 may include a hard disk drive (HDD), flash memory, a Universal Serial Bus (USB) drive or a combination these or other storage devices.

As shown, the computing device 1300 includes one or more I/O interfaces 1308, which are provided to allow a user to provide input to (such as user strokes), receive output from, and otherwise transfer data to and from the computing device 1300. These I/O interfaces 1308 may include a mouse, keypad or a keyboard, a touch screen, camera, optical scanner, network interface, modem, other known I/O devices or a combination of such I/O interfaces 1308. The touch screen may be activated with a stylus or a finger.

The I/O interfaces 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1308 are configured to provide graphical data to a display for presentation to a user. The graphical data may be representative of one or more graphical user interfaces and/or any other graphical content as may serve a particular implementation.

The computing device 1300 can further include a communication interface 1310. The communication interface 1310 can include hardware, software, or both. The communication interface 1310 provides one or more interfaces for communication (such as, for example, packet-based communication) between the computing device and one or more other computing devices or one or more networks. As an example, and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI. The computing device 1300 can further include a bus 1312. The bus 1312 can include hardware, software, or both that connects components of computing device 1300 to each other.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed:

1. A computer-implemented method comprising:
   - generating, from a text document, a structural vector from a structural graph, a syntactic vector from a syntactic graph, and a semantic vector from a semantic graph;
   - generating, utilizing an iterative deep graph learning model, an initial dependency graph structure from the structural vector generated from the structural graph, the syntactic vector generated from the syntactic graph, and the semantic vector generated from the semantic graph;
   - generating, utilizing a convolutional graph neural network, an entity-level relation matrix from the initial dependency graph structure; and
   - generating, from the entity-level relation matrix, a temporal dependency graph containing structure and relationships of the text document.

2. The computer-implemented method of claim 1, further comprising learning parameters to modify the convolutional graph neural network by determining a path reconstruction loss.

3. The computer-implemented method of claim 2, wherein determining the path reconstruction loss comprises maximizing a shortest dependency path between entity pairs as indicated by the entity-level relation matrix.

4. The computer-implemented method of claim 1, wherein generating, utilizing the iterative deep graph learning model, the initial dependency graph structure from the structural vector, the syntactic vector, and the semantic vector further comprises:
   - generating a multi-dimensional vector by combining the structural vector, the syntactic vector, and the semantic vector; and
   - generating the initial dependency graph structure from multi-dimensional vector.

5. The computer-implemented method of claim 1, further comprising:
   - generating a combined embedding utilizing tokens from the text document, levels of separation between nodes of the temporal dependency graph, and attention masks; and
   - generating, utilizing a temporally-informed self-attention layer of a time transformer, an output by utilizing the combined embedding.

6. The computer-implemented method of claim 4, further comprising:

generating a multi-dimensional vector for a first entity node of the text document; and generating an additional multi-dimensional vector for a second entity node of the text document.

7. The computer-implemented method of claim 1, wherein:

generating the structural vector, the syntactic vector, and the semantic vector further comprises extracting, utilizing an encoder, token level features from the text document; and utilizing a structural graph network to generate the structural vector from the structural graph, a syntactic graph network to generate the syntactic vector from the syntactic graph, and a semantic graph network to generate the semantic vector from the semantic graph.

8. The computer-implemented method of claim 1, wherein utilizing the iterative deep graph learning model comprises iteratively updating a graph structure to generate the initial dependency graph structure.

9. The computer-implemented method of claim 1, wherein utilizing the convolutional graph neural network further comprises generating the entity-level relation matrix by utilizing upsampling and downsampling layers with skip connections between the upsampling and downsampling layers.

10. The computer-implemented method of claim 1, wherein generating the temporal dependency graph further comprises utilizing a function to link relational probabilities between the entity-level relation matrix and an adjacency matrix.

11. A system comprising:

one or more memory devices; and one or more processors configured to cause the system to:

generate, from a text document, a structural vector from a structural graph, a syntactic vector from a syntactic graph, and a semantic vector from a semantic graph by extracting token level features from the text document;

generate a multi-dimensional vector for an entity node of the text document by combining the structural vector generated from the structural graph, the syntactic vector generated from the syntactic graph, and the semantic vector generated from the semantic graph;

generate, utilizing an iterative deep graph learning model, an initial dependency graph structure corresponding with an adjacency matrix from the multi-dimensional vector;

generate, utilizing a convolutional graph neural network, an entity-level relation matrix from the initial dependency graph structure; and generate, from the entity-level relation matrix and the adjacency matrix, a temporal dependency graph by linking relational probabilities between the entity-level relation matrix and the adjacency matrix.

12. The system of claim 11, wherein the one or more processors are further configured to cause the system to train the convolutional graph neural network by determining a path reconstruction loss.

13. The system of claim 12, wherein the one or more processors are further configured to cause the system to focus on entity pairs with relationships by maximizing a shortest dependency path between entity pairs as indicated by the entity-level relation matrix.

14. The system of claim 11, wherein the one or more processors are further configured to cause the system to:

generate, from the temporal dependency graph, a feature map comprising levels of separations between nodes of the temporal dependency graph and attention masks that indicate relationships between nodes of the temporal dependency graph; and generate a combined embedding utilizing tokens from the text document, the levels of separation between nodes of the temporal dependency graph, and the attention masks.

15. The system of claim 14, wherein the one or more processors are further configured to cause the system to generate, utilizing a temporally-informed self-attention layer of a time transformer, an output by utilizing the combined embedding.

16. A non-transitory computer-readable medium storing executable instructions which, when executed by at least one processing device, cause the at least one processing device to perform operations comprising:

in response to receiving a document understanding task, generating, from a text document, a structural vector from a structural graph, a syntactic vector from a syntactic graph, and a semantic vector from a semantic graph;

generating, from the structural vector, the syntactic vector, and the semantic vector, a temporal dependency graph;

generating a time transformer by injecting the temporal dependency graph into an attention mechanism of a pre-trained transformer, wherein the time transformer is temporally-aware according to the temporal dependency graph of the text document to execute one or more downstream machine learning document understanding tasks; and generating, utilizing the time transformer, an output for use in one or more downstream machine learning document understanding tasks.

17. The non-transitory computer-readable medium of claim 16, wherein the operations further comprise:

receiving, from a user of a client device a temporal search query as the document understanding task, wherein the temporal search query pertains to the text document; and generating, utilizing the output, a response to the temporal search query.

18. The non-transitory computer-readable medium of claim 17, wherein generating the temporal dependency graph comprises generating the temporal dependency graph from an entity-level relation matrix of the text document and an adjacency matrix of the text document.

19. The non-transitory computer-readable medium of claim 16, further comprising generating attention masks corresponding to a number of levels of separations between nodes of the temporal dependency graph.

20. The non-transitory computer-readable medium of claim 19, wherein the operations further comprise utilizing a hyperbolic feed-forward layer to learn weights for the attention masks, the weights indicating a degree of attention for the time transformer to process.

* * * * *